US008564622B1

(12) United States Patent
Quinn et al.

(10) Patent No.: US 8,564,622 B1
(45) Date of Patent: Oct. 22, 2013

(54) IMAGE GENERATION DEVICE FOR GENERATING MULTIPLE IMAGE STREAMS

(75) Inventors: Edward W. Quinn, Uniontown, OH (US); Randall W. Wallace, Uniontown, OH (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 13/610,379

(22) Filed: Sep. 11, 2012

Related U.S. Application Data

(60) Provisional application No. 61/620,826, filed on Apr. 5, 2012.

(51) Int. Cl.
G09G 5/00 (2006.01)
H04N 13/04 (2006.01)

(52) U.S. Cl.
USPC ............................................. 345/632; 348/51

(58) Field of Classification Search
CPC ............................ G06T 15/30; H04N 13/0497
See application file for complete search history.

(56) References Cited

U.S. PATENT DOCUMENTS

| | | | | |
|---|---|---|---|---|
| 5,137,450 A | * | 8/1992 | Thomas | 434/44 |
| 5,956,046 A | * | 9/1999 | Kehlet et al. | 345/502 |
| 6,057,847 A | | 5/2000 | Jenkins | |
| 6,141,034 A | | 10/2000 | McCutchen | |
| 7,385,684 B2 | | 6/2008 | Young et al. | |
| 2004/0109093 A1 | | 6/2004 | Small-Stryker | |
| 2006/0160049 A1 | * | 7/2006 | Zora | 434/29 |
| 2008/0095468 A1 | | 4/2008 | Klemmer et al. | |
| 2011/0234920 A1 | * | 9/2011 | Nelson | 348/745 |
| 2011/0267437 A1 | | 11/2011 | Abeloe | |
| 2012/0148173 A1 | * | 6/2012 | Shin et al. | 382/300 |
| 2012/0215598 A1 | * | 8/2012 | Georgis et al. | 705/14.4 |
| 2012/0310810 A1 | * | 12/2012 | Downs, II | 705/37 |

OTHER PUBLICATIONS

"Barco incorporates 'Stereo-Creator' in its Galaxy WARP active stereo 3-chip DLP projector," www.stereoscopy.com—3D-News: Archive, Oct. 9, 2003, 3 pages.
"CAE Tropos—6000 Series," CAE, 2 pages.
"Cross-cockpit collimated displays for flight simulation," NAVY SBIR 2008.2—Topic N08-146, May 19, 2008, 2 pages.
"EP-8000 image generator system," Rockwell Collins, Nov. 2011, 2 pages.
"EPX-500," Rockwell Collins, Nov. 2008, 2 pages.
"Generation10 Image Generators with BlueSky Real-Time Software," Equipe, 2011, 3 pages.

(Continued)

Primary Examiner — Kee M Tung
Assistant Examiner — Frank Chen
(74) Attorney, Agent, or Firm — Withrow & Terranova, PLLC

(57) ABSTRACT

An IG device configured to generate multiple image streams. The IG device may receive virtual environment (VE) model data identifying at least a portion of a VE. For each cycle of a plurality of cycles over a period of time, the VE model data may be intersected by a first view frustum to identify first scene data, and a graphics subsystem generates a first image based on the first scene data and outputs the first image for presentation. Substantially concurrently therewith, for each cycle, the VE model data may be intersected by a second view frustum to identify second scene data, and a second graphics subsystem of the device in parallel with the first graphics subsystem may generate a second image based on the second scene data and outputs the second image for presentation.

17 Claims, 15 Drawing Sheets

(56) References Cited

OTHER PUBLICATIONS

"MalmstromBox," UniVisual Technologies, published at least as early as Jun. 2012, 2 pages.
"New Sony TV: play splitscreen without splitscreen!," PSU Forums, Jun. 7, 2011, 10 pages.
"Wide-angle infinity display equipment," Wikipedia, published at least as early as Nov. 7, 2012, 1 page.
Hollister, S., "Sony's 24-inch PlayStation 3D 'dual-view' monitor: here's how it works," Engadget, Jun. 9, 2011, 3 pages.
Latham, "Tutorial: key image generator specifications: polygon capacity and pixel capacity," Dec. 1994, 3 pages.
Raskar, R. et al., "Seamless projection overlaps using image warping and intensity blending," Fourth International Conference on Virtual Systems and Multimedia, Gifu, Japan, Nov. 1998, 5 pages.
Non-final Office Action for U.S. Appl. No. 13/610,133 mailed Nov. 6, 2012, 26 pages.
Final Office Action for U.S. Appl. No. 13/610,133 mailed Mar. 12, 2013, 32 pages.
Mitchell, "Lord of the Rings Online Shadows of Angmar (LOTRO) Review," MTBS3D, Jul. 2008, http://www.mtbs3d.com/index.php?option=com_content&view=article&id=2747:Lord-of-the-Rings-Online-Shadows-of-Angmar-(LOTRO)-Review&catid=38:game-reviews&Itemid=76, 4 pages.
Advisory Action for U.S. Appl. No. 13/610,133 mailed Jul. 9, 2013, 4 pages.

\* cited by examiner

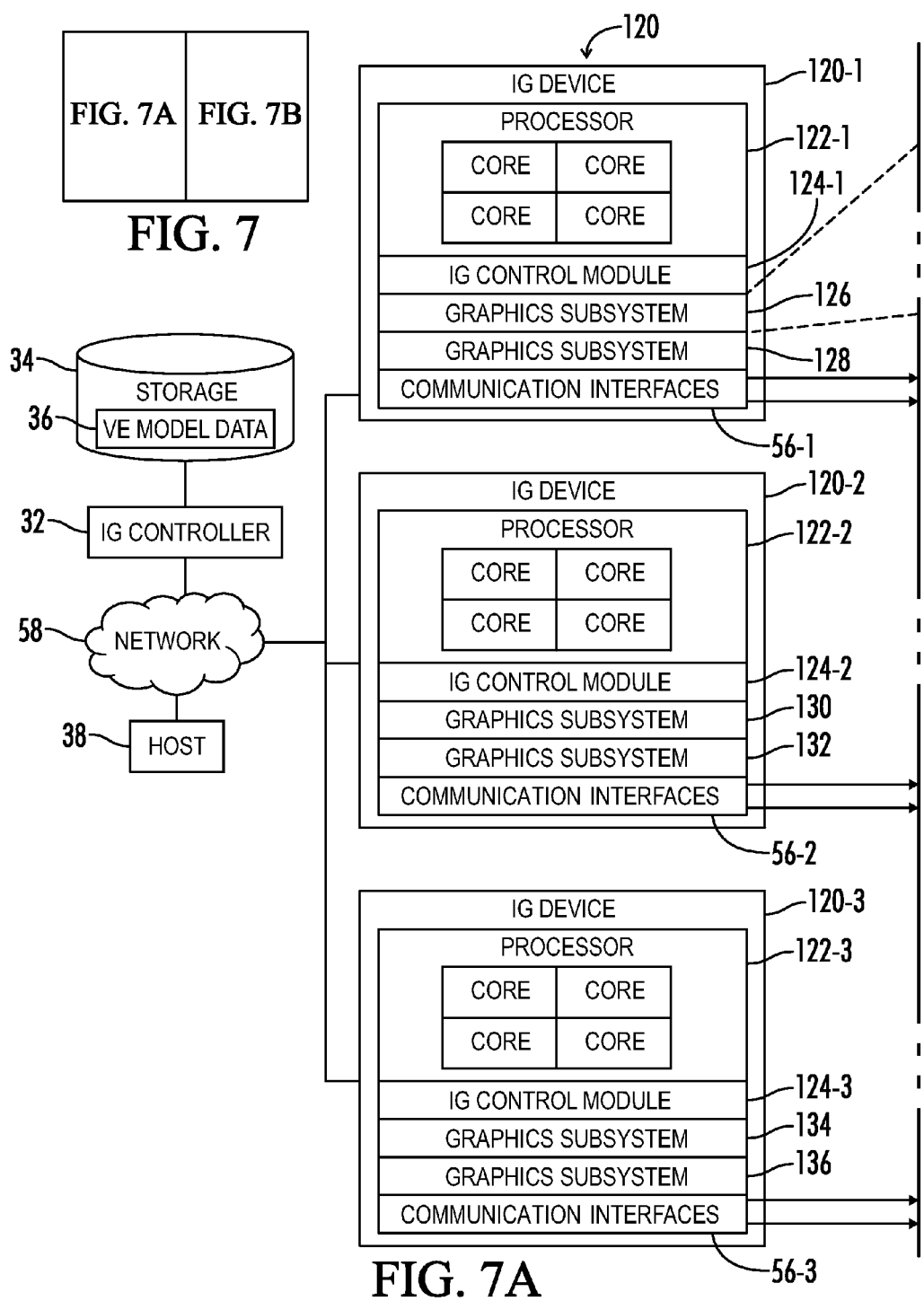

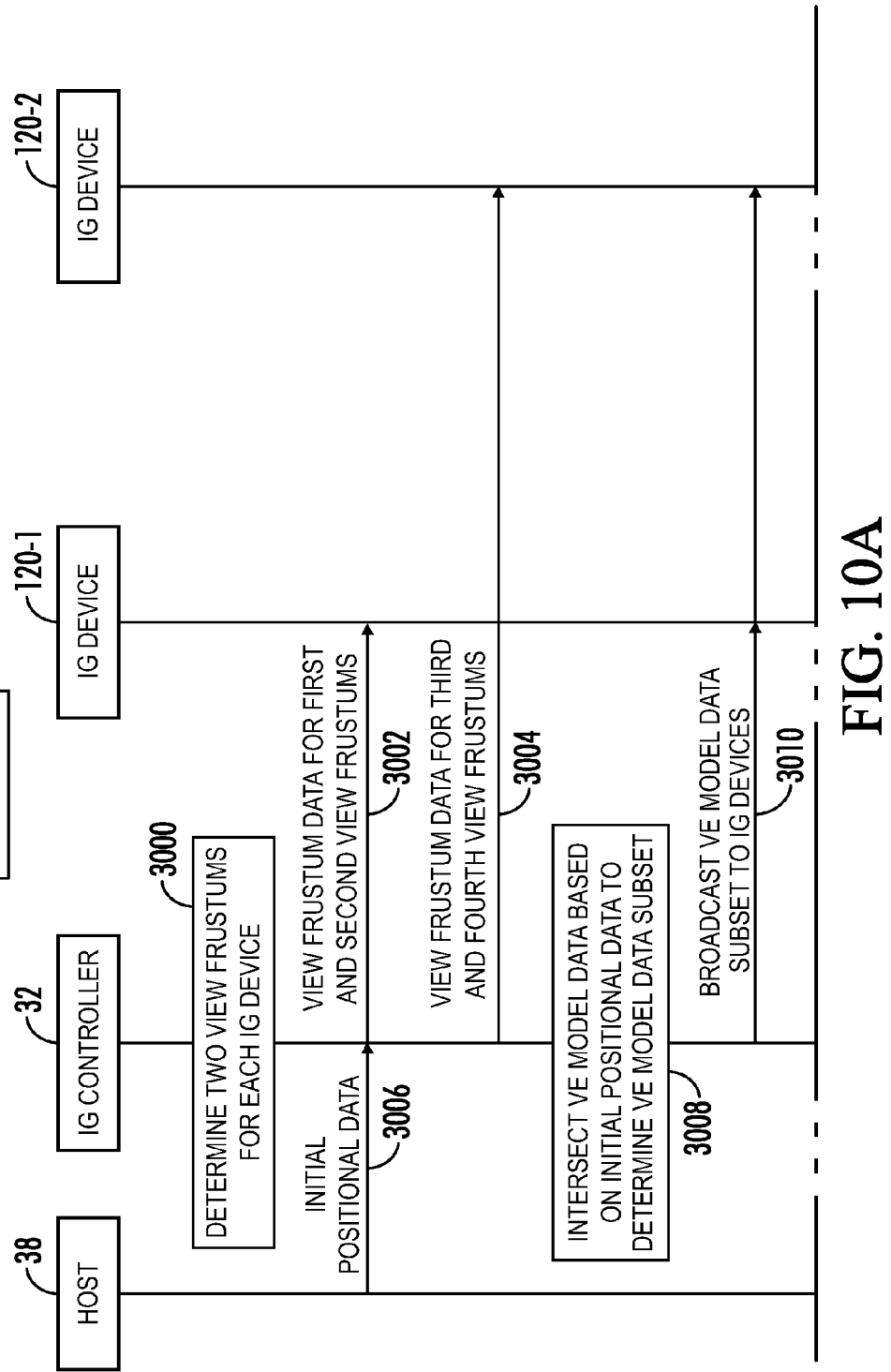

IMAGE GENERATION DEVICE FOR GENERATING MULTIPLE IMAGE STREAMS

RELATED APPLICATIONS

This application claims the benefit of U.S. provisional patent application No. 61/620,826, filed Apr. 5, 2012, the disclosure of which is hereby incorporated herein by reference in its entirety. This application is also related to "IMAGE GENERATION IN A SIMULATOR," filed on even date herewith and having the same named inventors, Ser. No. 13/610,133, the disclosure of which is hereby incorporated herein by reference in its entirety.

FIELD OF THE DISCLOSURE

The subject disclosure relates generally to image generation, and in particular to a device that may generate multiple image streams of a virtual environment.

BACKGROUND

High-fidelity, high-resolution simulators, such as those used to train pilots, strive to immerse the participant in imagery of a virtual environment such that the simulator experience closely matches that of the real-world analog environment. Often, such a simulator may use an immersive display system that is made up of multiple display screens, or monitors, that form a dome, or other structure that at least partially encloses the participant. To ensure sufficiently high-resolution imagery, multiple image streams of the virtual environment may be generated, each of which may depict a particular portion of the virtual environment. Each image stream may then be displayed in a particular display area of the display system, such that the multiple image streams collectively form a relatively large, cohesive view of the virtual environment to the participant. Because of the processing requirements which may be necessary to generate high-resolution image streams, each individual image stream may be generated by a separate network-addressable image generation (IG) device that comprises a chassis, a processor, and a graphics subsystem capable of rendering the images that make up the corresponding image stream. Unfortunately, this may result in a large number of IG devices being necessary for the execution of a high-resolution and high-fidelity simulation. Such a large number of IG devices may require a substantial amount of physical space, and in many environments in which a high-fidelity simulator is used, space is at a premium. A large number of IG devices may also necessitate that substantial cooling apparatus be available in order to maintain the IG devices at a desired temperature. Accordingly, there is a need for mechanisms that allow the generation of multiple image streams of a virtual environment with fewer IG devices.

SUMMARY

The present disclosure relates to an image generation (IG) device that may concurrently generate multiple different image streams for presentation in a simulator. The IG device may substantially reduce the number of IG devices needed to provide a high-fidelity simulation, thereby potentially reducing the physical space needed to house a simulator, potentially reducing the cooling requirements associated with maintaining a simulator at a desired operating temperature, and potentially reducing the number of components that may possibly develop maintenance issues.

In one embodiment, an IG device may receive virtual environment (VE) model data that identifies at least a portion of a VE. The IG device may determine a first view frustum in the VE and a second view frustum in the VE. For each cycle of a plurality of cycles over a period of time, the VE model data may be intersected by the first view frustum and the second view frustum to identify first scene data and second scene data, respectively. A first graphics subsystem of the device may generate a first image based on the first scene data. A second graphics subsystem of the device may generate a second image based on the second scene data in parallel with the first graphics subsystem. The first and second images may be output for display.

In one embodiment, the IG device may receive first view frustum data and second view frustum data from an IG controller. The first view frustum is may be determined by the IG device based on the first view frustum data, and the second view frustum may be determined by the IG device based on the second view frustum data. The first view frustum data may include a first viewpoint location and a first window definition, and the second view frustum data may include a second viewpoint location and a second window definition. In another embodiment, the first view frustum data may include the first viewpoint location and the first window definition, and the second view frustum data may include the first viewpoint location and the second window definition. The first window definition may be associated with a display area in which images are displayed to a participant in the simulator.

In one embodiment, the IG device may receive, for each cycle of a plurality of cycles, additional VE model data. The IG device may incorporate the additional VE model data into the VE model data to generate updated VE model data. The IG device may then intersect the updated VE model data with the first view frustum and the second view frustum to generate the first scene data and the second scene data, respectively.

In one embodiment the first image and the second image may be output in an image pair for alternate display of the first image and the second image in a same display area. The first image may be geometrically warped prior to outputting the first image for display. The second image may also be geometrically warped prior to outputting the second image for display. The first image may be geometrically warped based on a first viewpoint location, and the second image may be geometrically warped based on a second viewpoint location, such that the first and second images are geometrically warped differently.

An intensity of portions of the first image may also be altered based on a predetermined overlap region of a first display area with an adjacent second display area and on the first viewpoint location. An intensity of portions of the second image may also be altered based on a predetermined overlap region of the first display area with the adjacent second display area and on the second viewpoint location. In one embodiment each first image may be geometrically warped and intensity blended differently from a manner in which each second image is geometrically warped and intensity blended.

In one embodiment, the IG device may comprise a multiple-core processor, and first and second processing threads are initiated in parallel. The first processing thread may intersect the VE model data by the first view frustum to identify the first scene data, and the second processing thread may intersect the VE model data by the second view frustum to identify the second scene data. The first processing thread may be configured to communicate the first scene data to the first graphics subsystem, and the second processing thread may be configured to communicate the second scene data to the second graphics subsystem.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

The accompanying drawings incorporated in and forming a part of this specification illustrate several aspects of the disclosure, and together with the description serve to explain the principles of the disclosure.

FIGS. 7A and 7B illustrate a block diagram of a system in which additional embodiments may be practiced;

FIGS. 10A and 10B illustrate a message flow between elements in the system shown in FIG. 9 during a cycle according to one embodiment;

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

Figure 1:
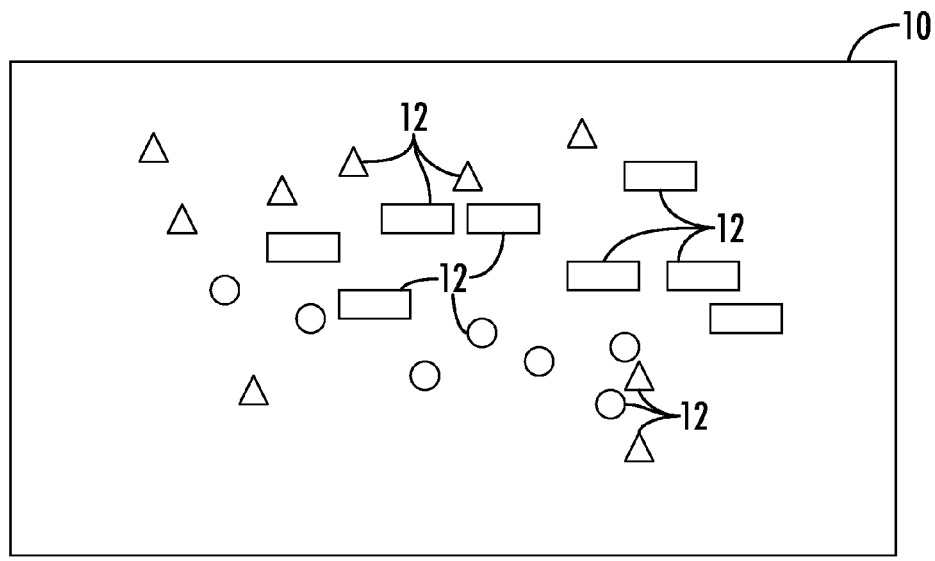
FIG. 1 is a block diagram illustrating a 2D rendering of one embodiment of a virtual environment (VE)

FIG. 1 is a block diagram illustrating a 2D rendering of one embodiment of a virtual environment (VE) 10. The VE 10 comprises a plurality of objects 12, which may comprise trees, vehicles, buildings, and any other item which may appear in a real world analog of the VE 10. While for purposes of illustration the VE 10 is shown in two-dimensions (2D), in practice the VE 10 may be a three-dimensional (3D) environment, and each of the objects 12 has a particular location in the VE 10 that may be defined, for example, by x, y, and z coordinates in a coordinate system associated with the VE 10. By way of non-limiting example, the VE 10 may model a particular geographic region in a foreign country.

The VE 10 may be used, by way of non-limiting example, to provide a simulation to one or more participants in a simulator. Generally, a simulator determines a particular view of the VE 10 based on a viewpoint location of a participant (sometimes referred to as "eye point" or "eye point location") and then generates and presents imagery of the VE 10 in one or more display areas of a plurality of display areas to the participant in the simulator. The one or more display areas may comprise, by way of non-limiting example, monitors, or screens on which images are projected. As the participant moves about the VE 10, by way of non-limiting example by directing a simulated vehicle through the VE 10, the imagery presented in the one or more display areas change. A problem may arise in a multiple participant simulator, such as, by way of non-limiting example, a dual cockpit simulator that enables a pilot participant and a copilot participant to simultaneously participate in the simulation, because each participant has a different view of the VE 10 due to the different viewpoint locations of the different participants.

In one embodiment, each participant would perceive the VE 10 in the same manner as they would if they were in a real world analog of the VE 10, but because the display areas used in a simulator can typically provide only a single view at any one time, the simulator typically presents a view that may be accurate from only one of the participants' perspectives.

Figure 2:
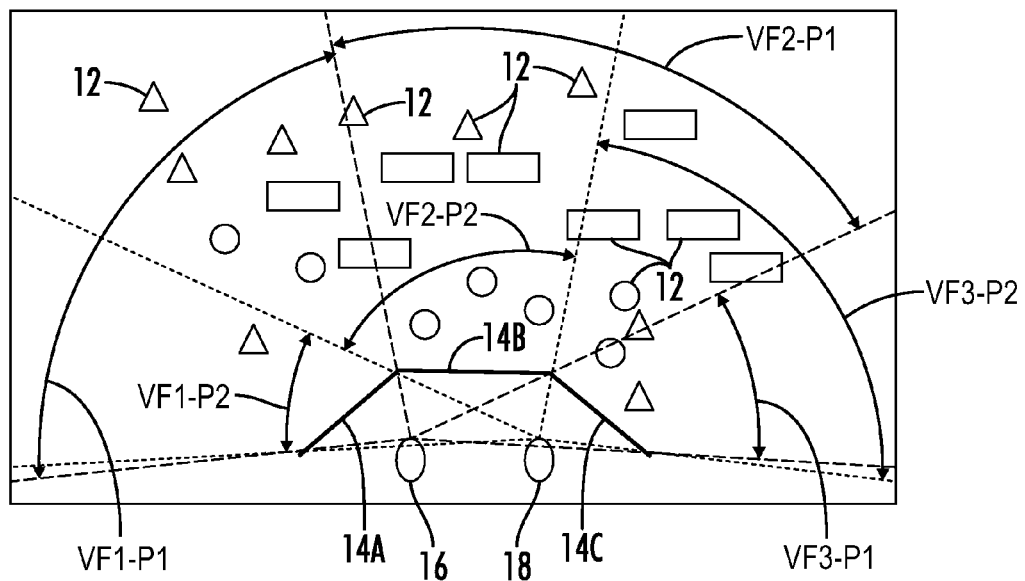
FIG. 2 is the block diagram of the 2D rendering of the VE illustrated in FIG. 1, along with cockpit windows.

This problem is illustrated in FIG. 2. FIG. 2 is a block diagram of the 2D rendering of the VE 10 illustrated in FIG. 1, along with cockpit windows 14A-14C. Assume that a pilot 16 and a copilot 18 are traveling through the VE 10 and viewing the VE 10 from behind the cockpit windows 14A-14C. When looking through the cockpit window 14A, the pilot 16 perceives a view portion VF1-P1 of the VE 10. The copilot 18, however, when looking through the cockpit window 14A, perceives a view portion VF1-P2 of the VE 10, which differs substantially from the view portion VF1-P1 due to the different viewpoint location of the copilot 18. If the cockpit window 14A corresponded to a display area of a plurality of display areas in a simulator, the view portion VF1-P1 should be rendered in the corresponding display area from the perspective of the pilot 16, but the view portion VF1-P2 should be rendered in the same corresponding display area from the perspective of the copilot 18. Similarly, when looking through the cockpit window 14B, the pilot 16 would perceive a view portion VF2-P1, and the copilot 18 would perceive a view portion VF2-P2. When looking through the cockpit window 14C, the pilot 16 would perceive a view portion VF3-P1, and the copilot 18 would perceive a view portion VF3-P2.

While for purposes of illustration embodiments disclosed herein are described in the context of a cockpit simulator, the embodiments are not limited to airplane simulations, and are applicable to the simulation of any environment or vehicle, including, by way of non-limiting example, shipboard training, land vehicle training, water vehicle training, underwater vehicle training and the like.

Figure 3:
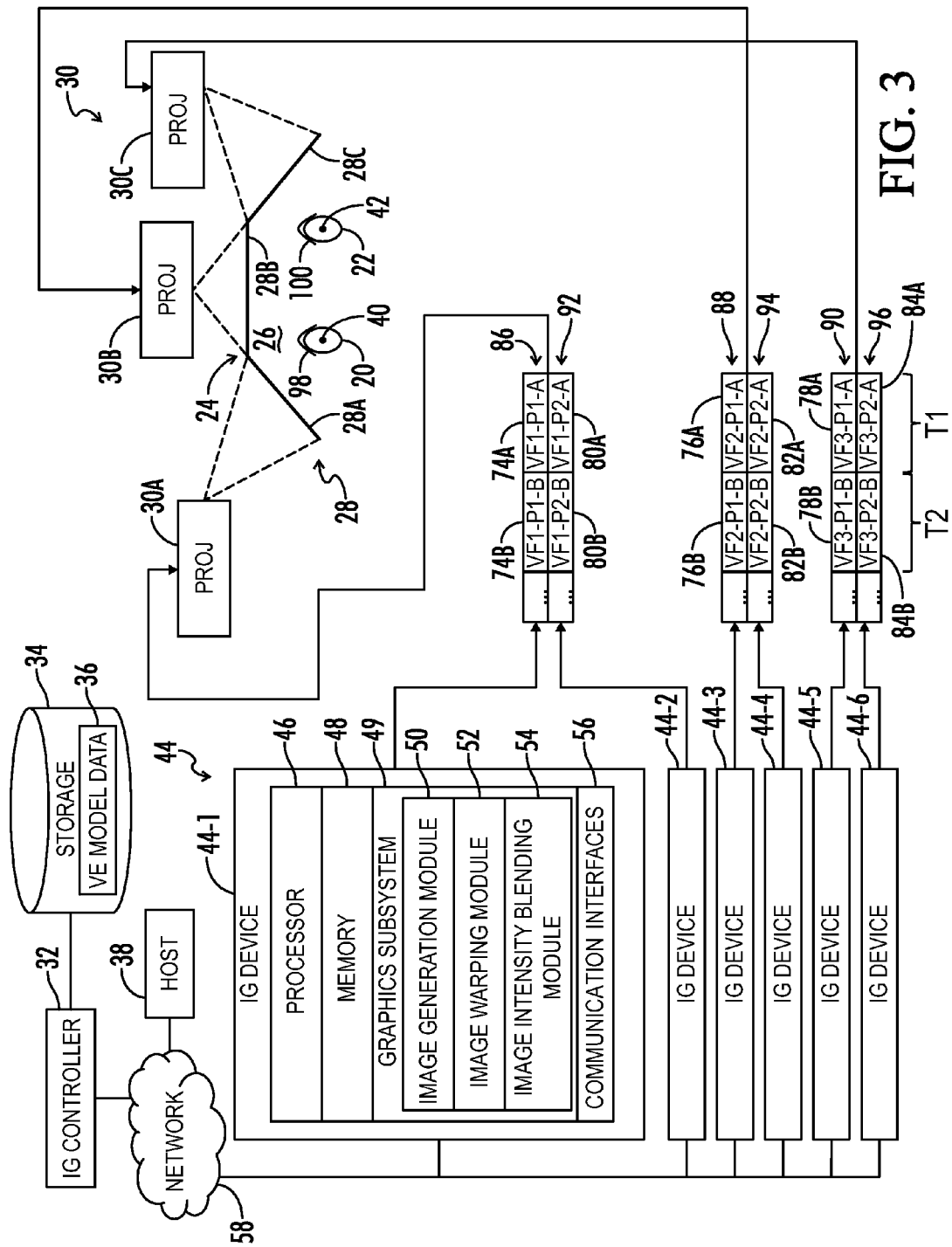
FIG. 3 is a block diagram of an embodiment of a system.

FIG. 3 is a block diagram of a system in which embodiments of the present disclosure may be practiced according to one embodiment. FIG. 3 will be discussed in conjunction with FIG. 2. A first participant 20 and a second participant 22 are located in viewing distance of a display 24 that simulates cockpit windows, such as the cockpit windows 14A-14C (FIG. 2) of a simulated airplane 26. The display 24 may comprise, by way of non-limiting example, a plurality of projection screens. The display 24 comprises three display areas 28A-28C (generally, display areas 28), each of which may correspond generally, by way of non-limiting example, to a different projection screen. In other embodiments, the display 24 may comprise multiple monitors, such as LCD monitors. While the display areas 28 are illustrated as relatively planar, and each being associated with a separate screen, in other embodiments the display 24 may comprise a curved screen, and each display area 28 may comprise a portion of a single curved screen. Also, as discussed in greater detail herein, the display areas 28 may overlap one another.

The use of ordinals in conjunction with an element label, such as "first view" or "second view," is not intended to imply an importance, priority, or other attribute unless specifically discussed herein. Rather, the use of such ordinals is simply to distinguish between different elements that would otherwise have similar or identical labels, such as a first view and a second view.

While for purposes of illustration, the display 24 is illustrated as comprising three screens, in practice, the display 24 may comprise a plurality of screens, or monitors, that completely or partially surround the first and second participants 20, 22, to provide an immersive experience that closely simulates the real world apparatus that may be simulated, such as a jet fighter, a commercial airplane, a helicopter, a ground vehicle, a water vehicle, an underwater vehicle or the like. Accordingly, in such a simulator there may be many, many display areas 28.

During a simulation, a plurality of display devices, such as projectors 30A-30C (generally, projectors 30), each present images on a corresponding display area 28A-28C to the first and second participants 20, 22. The particular imagery provided to the first and second participants 20, 22 depends on a variety of factors, including the particular real world environment being modeled, the actions of the first and second participants 20, 22, and the particular respective viewpoints of the first and second participants 20, 22.

The presentation of imagery to the first and second participants 20, 22 may be controlled, in part, by an image generator (IG) controller 32. The IG controller 32 may be communicatively coupled to a storage 34 in which a structure, such as a database, or a scene graph, maintains VE model data 36 which defines the VE 10. The VE model data 36 comprises information about the objects 12 in the VE 10, including the logical and spatial representations of the objects 12 in the VE 10. The IG controller 32 may be communicatively coupled to a host 38, which in turn may be communicatively coupled to simulation drive apparatus (not illustrated), such as, by way of non-limiting example, a throttle and/or steering wheel, in the simulated airplane 26 that may be manipulated by one or both of the first and second participants 20, 22 to move the simulated airplane 26 about the VE 10. The host 38 may also be coupled to one or more other simulated vehicles, such as other simulated airplanes, ground vehicles, water vehicles, underwater vehicles and the like, operated by other participants participating in the simulation, who are moving such simulated vehicles about the VE 10 concurrently with the first and second participants 20, 22. Such other simulated vehicles may also be represented by respective objects 12 in the VE model data 36.

The host 38 may provide host data to the IG controller 32 that may be sufficient to enable the IG controller 32 to continually, over a period of time, update the VE model data 36 as appropriate to reflect movements of objects 12 in the VE 10, and to facilitate the generation of imagery for presentation to the first and second participants 20, 22. Such host data may include observer view reference data that identifies a first viewpoint location 40 (e.g., eyepoint location) of the first participant 20, and a second viewpoint location 42 of the second participant 22, as well as a particular angular orientation of the heads of the first and second participants 20, 22. Alternatively, a default angular orientation may be assumed. The host data provided by the host 38 may also include position data of entities in the VE 10, such as the x-, y-, z-coordinate position of the simulated airplane 26, the pitch, yaw, and roll orientation of the simulated airplane 26, or a state of the simulated airplane 26, such as a damage state, an afterburner state, and the like. The host 38 may provide similar host data for each other simulated vehicle in the VE 10. The host data may also identify conditions of the VE 10, such as environmental conditions like the weather.

The IG controller 32 may also be communicatively coupled to a plurality of IG devices 44-1-44-6 (generally, IG devices 44), each of which generates imagery comprising an image stream of images for display in the display area 28 based on the current state of the VE model data 36. The IG device 44-1 includes one or more processors 46, including graphics processing chipsets, suitable for carrying out the functionality described herein, and for rendering and rasterizing the imagery, as discussed in greater detail herein. A memory 48 may be used to store programming instructions, which, when loaded onto the processor 46, carry out at least some of the functionality described herein. A graphics subsystem 49 comprises an image generation module 50, which represents programming instructions, circuitry, or a combination thereof suitable for generating images, as appropriate. In combination with the image generation modules 50 in the other IG devices 44, such image generation modules 50 may form an image generation subsystem. An image warping module 52 may represent programming instructions, circuitry, or a combination thereof suitable for warping the images, as discussed in greater detail herein, as appropriate. Warping may be desired in a number of circumstances, such as, by way of non-limiting example, where the display 24 comprises a curved screen, or where the projectors 30 are not able to be positioned such that the plane of the lens of a projector 30 may be precisely parallel to the plane of a corresponding screen. In combination with the image warping module 52 in the other IG devices 44, such image warping modules 52 may form an image warping subsystem.

An image intensity blending module 54 may represent programming instructions, circuitry, or a combination thereof suitable for intensity blending of the images as appropriate. Intensity blending may be desirable to reduce variations in light intensity based on, by way of non-limiting example, the different first and second viewpoint locations 40, 42, or based on the variations of intensity caused by the overlap of images from adjacent projectors 30, or based on intrinsic variations in light due to a particular technology, such as LCD technology. In particular, such variations may be modulated by the light reflecting or light refracting properties of the respective display, such as the degree to which the display possesses specular or lambertian light transmission or reflection characteristics. In combination with the image intensity blending modules 54 in the other IG devices 44, such image intensity blending modules 54 may form an image intensity blending subsystem.

Communication interfaces 56 may include a network communication interface suitable for communicating with a network 58, via which the IG device 44-1 may communicate with the IG controller 32. Communication interfaces 56 also may include a display communication interface suitable for providing images to a corresponding projector 30. Non-limiting examples of a display communication interface include a DVI interface, an HDMI interface, an RS-232 interface, an Ethernet interface, or any combination thereof. While for purposes of illustration only the IG device 44-1 is shown in detail, each of the IG devices 44-2-44-6 may be similarly configured. In combination with the communication interfaces 56 in the other IG devices 44, such communication interfaces 56 form a communication interface subsystem.

The IG controller 32 may provide the VE model data 36 to the IG devices 44 via the network 58, or a portion of the VE model data 36 that may be relevant to the current views of the VE 10 that may be perceived by the first and second participants 20, 22 at a given point in time. The IG controller 32 may continually broadcast updates of the relevant portions of the VE model data 36 to the IG devices 44, so that the IG devices 44 stay in synchronization with the current state of the VE 10. The updates may comprise position and orientation updates of one or more objects 12, and may include additional static or dynamic objects 12, which may increase the realism of the VE 10 as the simulated airplane 26 moves about the VE 10.

Each IG device 44 may correspond to a particular display area 28. In this example, IG devices 44-1 and 44-2 correspond to the display area 28A, IG devices 44-3 and 44-4 correspond to the display area 28B, and IG devices 44-5 and 44-6 correspond to the display area 28C. The correspondence may be such that images generated by an IG device 44 are generated for presentation, or display, in the corresponding display area 28.

Each display area 28 may have an associated one or more corresponding window definitions. Each window definition may define, in part, a view into the VE 10. A window definition may comprise, by way of non-limiting example, a horizontal field of view (FOV) and a vertical FOV into the VE 10. The window definitions of each of the display areas 28 may differ from one another. The window definitions may also differ for each of the first and second participants 20, 22. Each IG device 44 may use a window definition in conjunction with a viewpoint location to determine a view frustum into the VE 10. The intersection of a view frustum with the VE 10 may define the particular imagery that may be generated by the respective IG device 44. The particular window definition and viewpoint location used by an IG device 44 to generate a respective view frustum may be assigned to the IG device 44 by the IG controller 32 during an initialization phase of the simulation. Alternatively, the particular window definition and viewpoint location used by an IG device 44 may be preconfigured into the respective IG device 44 by an operator prior to the initiation of the simulation.

While for the purposes of illustration certain components are illustrated as having certain relations to other components, the embodiments are not limited to any particular arrangements of components, and are applicable to any arrangement that implements the processes and methods discussed herein. By way of non-limiting example, although the image warping module 52 and image intensity blending module 54 are, for purposes of illustration, shown as being incorporated with the IG device 44-1, the embodiments are not so limited, and the image warping module 52 and image intensity blending module 54 may be implemented in an additional component between the IG device 44-1 and the projector 30A, or may even be implemented in components in the projector 30A.

Figure 4:
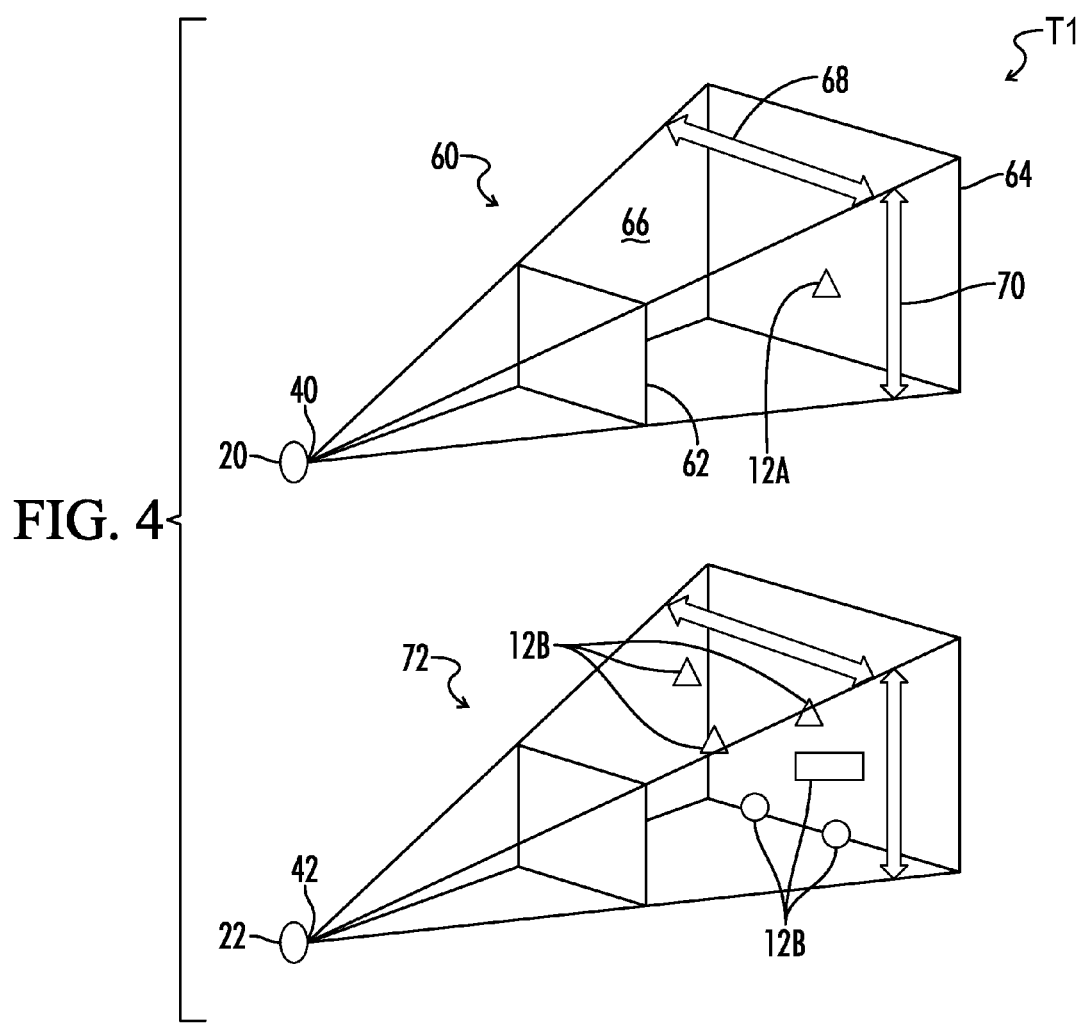
FIG. 4 illustrates an embodiment of view frustums at an arbitrary point in time T1.

FIG. 4 illustrates view frustums at an arbitrary point in time T1. Assume that a view frustum 60 may be based on a first window definition associated with the first viewpoint location 40 of the first participant 20 and corresponds to the display area 28A, and that the first window definition and the first viewpoint location 40 may be assigned to the IG device 44-1. The IG device 44-1 may use the first viewpoint location 40 and the first window definition to determine the view frustum 60, and intersect the VE model data 36 with the view frustum 60. The view frustum 60 may include a near plane 62, a far plane 64, and top, right, bottom, and left planes 66 that define a volume of the VE 10. The view frustum 60 may be defined, in part, by the first window definition which identifies a horizontal FOV 68 and a vertical FOV 70. The portion of the VE 10, including by way of non-limiting example an object 12A, within the view frustum 60 may comprise the scene data that may be rendered by the IG device 44-1 and displayed in the display area 28A at time T1 for the first participant 20.

Assume that a view frustum 72 may be based on a second window definition associated with the second viewpoint location 42 of the second participant 22 and also corresponds to the display area 28A, and that the second window definition and the second viewpoint location 42 are assigned to the IG device 44-2. The IG device 44-2 may use the second viewpoint location 42 and the second window definition to determine the view frustum 72, and intersect the VE model data 36 with the view frustum 72. The portion of the VE 10, which may include, by way of non-limiting example, objects 12B, within the view frustum 72 may be what is rendered by the IG device 44-2 and displayed in the display area 28A at time T1 for the second participant 22.

Referring again to FIG. 3, assume that the IG device 44-1 has been assigned the first viewpoint location 40 of the first participant 20, and a window definition corresponding to the display area 28A, and the IG device 44-2 has been assigned the second viewpoint location 42 of the second participant 22, and a window definition corresponding to the display area 28A. Assume that the IG device 44-3 has been assigned the first viewpoint location 40, and a window definition corresponding to the display area 28B, and the IG device 44-4 has been assigned the second viewpoint location 42, and a window definition corresponding to the display area 28B. Assume that the IG device 44-5 has been assigned the first viewpoint location 40, and a window definition corresponding to the display area 28C, and the IG device 44-6 has been assigned the second viewpoint location 42, and a window definition corresponding to the display area 28C.

During the simulation, each IG device 44 may generate a respective image for each cycle of a plurality of cycles based on the determined view frustum into the VE 10. A cycle may comprise any suitable period of time, such as, by way of non-limiting example, $\frac{1}{30}^{th}$ of a second or $\frac{1}{60}^{th}$ of a second, depending on the processing capacity of the IG devices 44, a framerate of the projectors 30, and other factors. Thus, at the time T1, the IG device 44-1 may generate a first image 74A. As discussed above, the first image 74A may be generated based on the view frustum determined by the IG device 44-1 and its intersection with the VE model data 36 at the time T1. Also at the time T1, the IG device 44-3 may generate a first image 76A, and the IG device 44-5 may generate a first image 78A. The first images 74A-78A may be provided, in synchronization, to the projectors 30A-30C and presented to the first participant 20 to give the first participant 20 a first view of the VE 10.

Substantially concurrently therewith, at the time T1, the IG device 44-2 generates a second image 80A. As discussed above, the second image 80A may be generated based on the view frustum determined by the IG device 44-2 and its intersection with the VE model data 36 at the time T1. Because the view frustum determined by the IG device 44-2 may be different from the view frustum determined by the IG device 44-1, the second image 80A may differ from the first image 74A, although both such images were generated at substantially the same time.

Also at the time T1, the IG device 44-4 may generate a second image 82A, and the IG device 44-6 may generate a second image 84A. The second images 80A-84A may be provided, in synchronization, to the projectors 30A-30C and presented to the second participant 22 to give the second participant 22 a second view of the VE 10.

Time T1 covers a single cycle of the simulation. At a later (such as, by way of non-limiting example, $1/60^{th}$ of a second) time T2, the process may be repeated, and additional first and second images may be generated by respective IG devices 44. Thus, times T1 and T2 may each cover a particular period of time, e.g., ~$1/60^{th}$ of a second, and in the aggregate cover a $1/30^{th}$ of a second period of time. Thus, over a period of time, each IG device 44 may generate an image stream that comprises a succession of respective images generated by the respective IG device 44. In particular, the IG device 44-1 may generate a first image stream 86 that comprises a plurality of first images, including first images 74A, 74B, and additional first images generated over the period of time. The IG devices 44-3, 44-5 similarly may generate first image streams 88 and 90, respectively. The IG devices 44-2, 44-4, 44-6 may generate second image streams 92, 94, 96 respectively. Thus, each first image stream 86-90 may depict a portion of the first view, and each second image stream 92-96 depicts a portion of the second view.

Each image stream may correspond to the display area 28 to which the IG device 44 which generated the image stream corresponds. Thus, the first image stream 86 and second image stream 92 may correspond to the display area 28A, the first image stream 88 and second image stream 94 correspond to the display area 28B, and the first image stream 90 and second image stream 96 correspond to the display area 28C.

In one embodiment, in synchronization, image pairs that comprise a first image and a second image from first and second image streams that correspond to a same display area may be provided for alternate display of such first and second images in the same display area. By way of non-limiting example, the communication interface 56 provides an image pair that comprises the first image 74A and the second image 80A to the projector 30A for alternate display of the first image 74A and the second image 80A in the display area 28A. The projectors 30 comprise, in one embodiment, projectors that are capable of receiving images associated with two image streams, and alternate the display of images from each of the two image streams. Such projectors are sometimes referred to as stereoscopic, or 3D, projectors, and often operate at 120 Hz, such that each image in the image pair may be displayed for, by way of non-limiting example, $1/120^{th}$ of a second, and the pair of images, in aggregate, may be displayed for, by way of non-limiting example, a duration of $1/60^{th}$ of a second.

In synchronization, an image pair comprising an interleaved first image 76A and second image 82A may be provided to the projector 30B and an image pair comprising an interleaved first image 78A and second image 84A may be provided to the projector 30C. Thus, the first images 74A-78A may be presented in the respective display areas 28A-28C to provide a first view of the VE 10, and at a substantially concurrent time later (by way of non-limiting example $1/120^{th}$ of a second later), the second images 80A-84A may be presented in the respective display areas 28A-28C to provide a second view of the VE 10. The image pairs may be provided to a respective projector via a single communication path, such as via a DVI cable, or via separate communication paths, such as two DVI cables.

In one embodiment, the projectors 30 may be capable of projecting the first images using light polarized in a first direction, such as a right-handed circular direction, and the second images using light polarized in a second direction, such as a left-handed circular direction. In such embodiment, the first participant 20 may wear a user viewing device 98 that may comprise polarized glasses that allow the passage of light polarized in a right-handed circular orientation, and block light not polarized in the right-handed circular orientation. The second participant 22 may wear a user viewing device 100 that may comprise polarized glasses that allow the passage of light polarized in a left-handed circular orientation, and block light not polarized in the left-handed circular orientation. Thus, the first participant 20 may perceive the first images, such as the first images 74A-78A, but does not perceive the second images, and the second participant 22 may perceive the second images, such as the second images 80A-84A, but not the first images.

In an alternate embodiment, the user viewing devices 98, 100 may comprise shutter glasses, which may be synchronized with the projectors 30, such that the shutters of the user viewing device 98 may open in synchronization with the display of the first images and close during the display of the second images, and the shutters of the user viewing device 100 may open in synchronization with the display of the second images and close during the display of the first images.

In other embodiments, where other display devices, such as LCD or plasma monitors rather than projectors and screens, are used to display images, each monitor may similarly be capable of receiving images associated with two image streams, and alternate the display of images from each of the two images. Such monitors are sometimes referred to as stereoscopic, or 3D, monitors, and may operate at 120 Hz, such that each image in the pair of images may be displayed for $1/120^{th}$ of a second, and the image pairs, in aggregate, may be displayed for a duration of $1/60^{th}$ of a second. Polarizers may be used in conjunction with such monitors to polarize the first images in a first direction and the second images in a second direction. Alternatively, shutter glasses that may be synchronized with the monitors may be worn by the first and second participants 20, 22 so that the first participant 20 may perceive only the first images and the second participant 22 may perceive only the second images.

Figure 5:
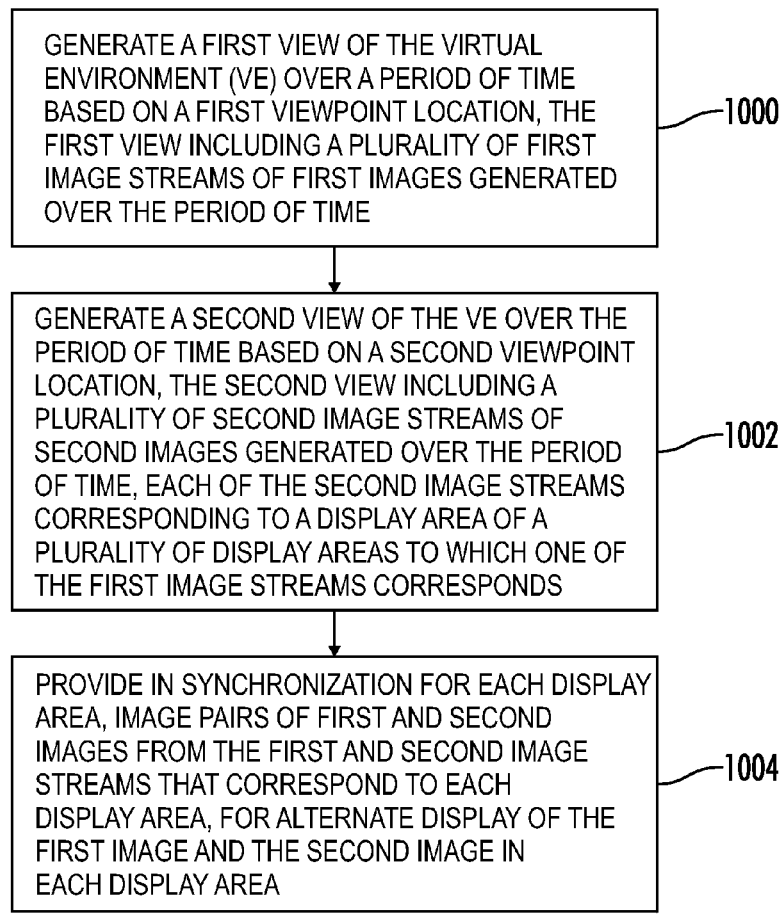
FIG. 5 is a flowchart of a method of generating multiple views of a VE according to one embodiment.

FIG. 5 is a flowchart of a method of generating multiple views of the VE 10 according to one embodiment. FIG. 5 will be discussed in conjunction with FIG. 3. Over a period of time, such as the period of time that encompasses times T1, T2, the IG devices 44-1, 44-3, 44-5 may generate a first view based on the first viewpoint location 40. The first view may comprise the first image streams 86-90, each of which may comprise first images generated over the period of time (block 1000). Over the same period of time, the IG devices 44-2, 44-4, 44-6 may generate a second view based on the second viewpoint location 42. The second view may comprise the second image streams 92-96, each of which comprises second images generated over the period of time. Each second image stream 92-96 may correspond to a display area 28 to which one of the first image streams 86-90 may correspond (block 1002). In particular, the first image stream 86 and the second image stream 92 may correspond to the display area 28A since both image streams may be displayed in the display area 28A, the first image stream 88 and second image stream 94 may correspond to the display area 28B, and the first image stream 90 and second image stream 96 may correspond to the display area 28C.

In synchronization with one another, the IG devices 44 may provide, for each display area 28, image pairs of first and second images from the first and second image streams that may correspond to the respective display area 28, for alternate display of the first and second images in the respective display area 28 (block 1004).

Referring again to FIG. 3, in one embodiment, each first image may be accessed and geometrically warped by the image warping module 52 in the respective IG device 44 that generates the each first image prior to providing the first images for presentation in the corresponding display area 28. Geometric warping may be desired where, by way of non-limiting example, the plane of a projector 30 may not be precisely parallel to the plane of a screen on which the projector 30 projects an image. Geometric warping may also be desired where a non-planar screen, such as a curved screen, may be utilized such that geometric warping may be based on a geometry associated with a display area. Each second image may also be geometrically warped by the image warping module 52 in the respective IG device 44 that generates the second image prior to providing the second image for presentation in the corresponding display area 28. The image warping modules 52 may geometrically warp the images based at least in part on a respective viewpoint location. Thus, the first images may be geometrically warped based on the first viewpoint location 40, and the second images may be geometrically warped differently from the first images based on the second viewpoint location 42.

Figure 6:
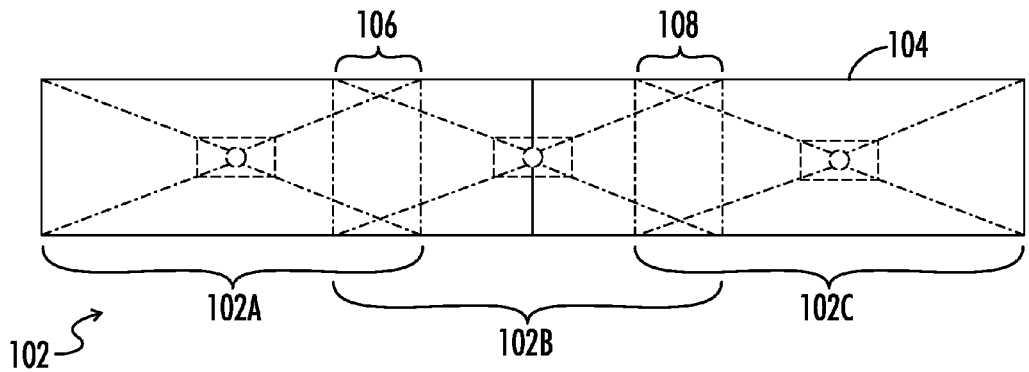
FIG. 6 is a block diagram of a plurality of display areas on a screen.

FIG. 6 is a block diagram of a plurality of display areas 102A-102C (generally, display areas 102) on a screen 104. The display area 102A may overlap the display area 102B and thus form an overlap region 106. The display area 102B may also overlap the display area 102C and thus forms an overlap region 108. Because the overlap regions 106, 108 are regions wherein the light output of multiple projectors overlap one another, the overlap regions 106, 108 may be perceived by participants as having a different, brighter, intensity than the non-overlapped regions of the display areas 102. Such variations in light intensity may be unrealistic, and thus may detract from the simulation experience of the participants.

In one embodiment, the image intensity blending module 54 may alter the intensity of portions of the first images of first image streams, such as the first images 74A, 74B of the first image stream 86, based on the predetermined overlap region, such as the overlap region 106, and further based on a particular viewpoint location, such as the first viewpoint location 40. Thus, the image intensity blending module 54 of the IG device 44-1 may determine which pixels of the first image 74A map to the overlap region 106, and may alter an intensity, or other image characteristic, of such pixels such that when displayed in the display area 102A in conjunction with the first image 76A being displayed in the display area 102B, the light intensity in the overlap region 106 may be substantially similar to that of the light intensity in non-overlapping regions of the display areas 102. Similarly, the image intensity blending module 54 of the IG device 44-3 may determine which pixels of the first image 76A map to the overlap region 106, and may alter an intensity, or other image characteristic, of such pixels such that when displayed in the display area 102B in conjunction with the first image 74A being displayed in the display area 102A, the light intensity in the overlap region 106 may be substantially similar to that of the light intensity in non-overlapping regions of the display areas 102. Thus, the image intensity blending modules 54 may alter such images in coordination with one another such that the overall alteration of multiple first images results in a desired light intensity.

Light intensity may differ depending on the viewpoint location of a participant. Thus the image intensity blending modules 54 in the IG devices 44-2, 44-4, 44-6 may alter portions of the second images generated by such IG devices based on the second viewpoint location 42.

In combination, therefore, each of the IG devices 44-1, 44-3, 44-5 may generate a respective first image, geometrically warp the first image based on the first viewpoint location 40, and intensity blend the respective first image based on the first viewpoint location 40 such that when depicted in synchronization in a display area 28 (FIG. 3) with the other first images that make up the first view, the first participant 20 may view a geometrically accurate, viewpoint accurate, light-uniform view of the VE 10 that closely simulates a view of the real world analog of the VE 10. Concurrently, each of the IG devices 44-2, 44-4, 44-6 may generate a respective second image, geometrically warp the second image based on the second viewpoint location 42, and intensity blend the respective second image based on the second viewpoint location 42 such that when depicted in synchronization in a display area 28 (FIG. 3) with the other second images that make up the second view, the second participant 22 may view a geometrically accurate, viewpoint accurate, light-uniform view of the VE 10 that closely simulates the view of the real world analog of the VE 10.

Figure 7B:
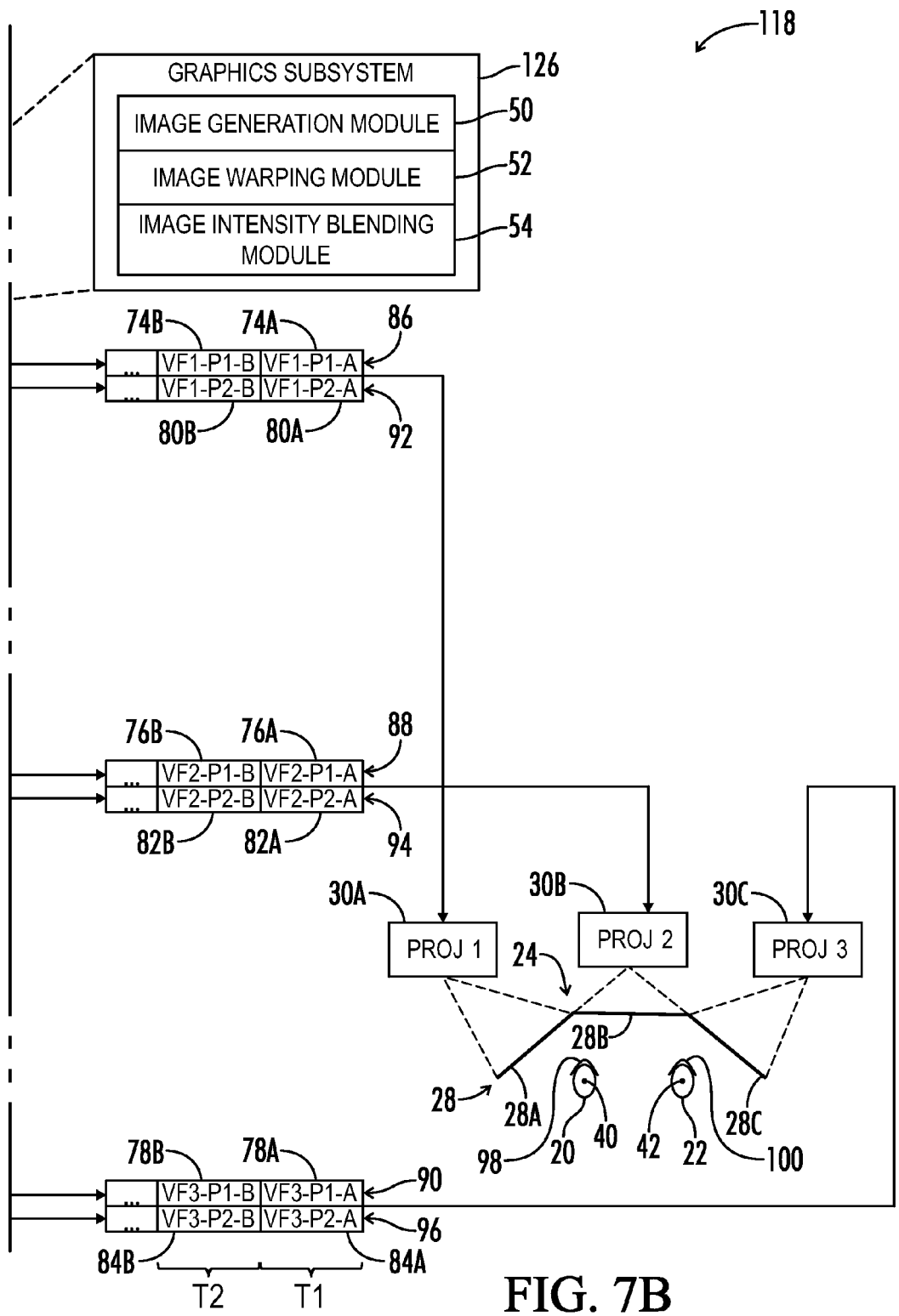

FIGS. 7A and 7B illustrate a block diagram of a system 118 in which additional embodiments may be practiced. In this embodiment, as discussed previously, a first view comprising a plurality of first image streams, each of which may comprise first images, may be presented to the first participant 20, and a second view may comprise a plurality of second image streams, each of which may comprise second images, may be presented to the second participant 22.

In this embodiment, however, the system 118 may include a plurality of IG devices 120-1-120-3 (generally, IG devices 120), each of which may be capable of concurrently generating images associated with multiple view frustums. Thus, by way of non-limiting example, each IG device 120 may be capable of substantially concurrently generating both a first image associated with a first view and a second image associated with a second view. Among other features, the IG devices 120 may collectively reduce the number of IG devices needed to provide a high-fidelity simulation to the first and second participants 20, 22, may reduce the physical space needed to house a simulator, may reduce the cooling requirements associated with maintaining the simulator at a desired operating temperature, and may reduce the number of components that may possibly develop maintenance issues.

The IG device 120-1 may include a multiple-core processor 122-1, which may facilitate the parallel and concurrent execution of multiple threads by the IG device 120-1, which will be discussed in greater detail herein. Similarly, the IG devices 120-2, 120-3 may include multiple-core processors 122-2, 122-3, respectively. The IG device 120-1 may also include an IG control module 124-1, which, among other features, may be capable of determining first and second view frustums, and intersecting the VE model data 36 with the first and second view frustums to determine first and second scene data, respectively. The IG control module 124-1 may also communicate the first scene data to a graphics subsystem 126 for rendering and rasterization of a first image based on the first scene data, and the second scene data to a graphics subsystem 128 for rendering and rasterization of a second image based on the second scene data.

The IG device 120-2 similarly may include an IG control module 124-2, which, among other features, may be capable of determining third and fourth view frustums, and intersecting the VE model data 36 with the third and fourth view frustums to determine third and fourth scene data, respectively. The IG control module 124-2 may also communicate the third scene data to a graphics subsystem 130 for rendering and rasterization of a first image based on the third scene data, and the fourth scene data to a graphics subsystem 132 for rendering and rasterization of a second image based on the fourth scene data.

The IG device 120-3 similarly may include an IG control module 124-3, which, among other features, may be capable of determining fifth and sixth view frustums, and intersecting the VE model data 36 with the fifth and sixth view frustums to determine fifth and sixth scene data, respectively. The IG control module 124-3 may also communicate the fifth scene data to a graphics subsystem 134 for rendering and rasterization of a first image based on the fifth scene data, and the sixth scene data to a graphics subsystem 136 for rendering and rasterization of a second image based on the sixth scene data.

The graphics subsystem 126 may include the image generation module 50, the image warping module 52, and the image intensity blending module 54, such that the graphics subsystem 126 may generate a first image based on first scene data, geometrically warp the first image based at least in part on the first viewpoint location 40, and intensity blend the first image based at least in part on the first viewpoint location 40. Although not illustrated, each of the graphics subsystems 128-136 may be similarly configured with the image generation module 50, the image warping module 52, and the image intensity blending module 54.

Figure 8:
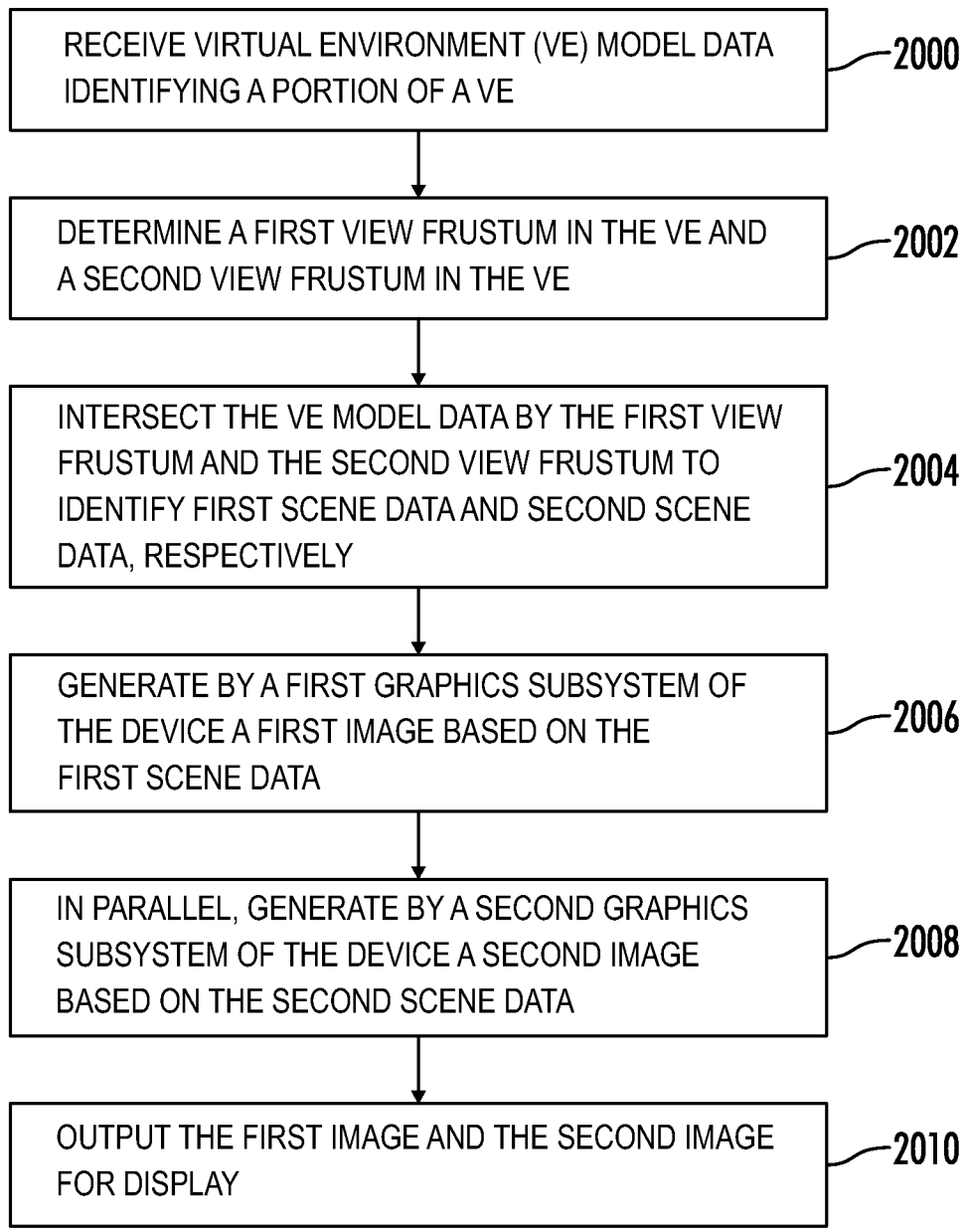
FIG. 8 is a flowchart illustrating a method for an image generator (IG) device to concurrently generate multiple image streams according to one embodiment.

FIG. 8 is a flowchart illustrating a method for an IG device to substantially concurrently generate multiple image streams according to one embodiment. FIG. 8 will be discussed in conjunction with FIG. 7. For purposes of illustration, the method will be discussed with reference to the IG device 120-1 generating first and second images during a cycle at time T1, but it should be apparent that concurrently therewith, in parallel, the IG devices 120-2, 120-3 may implement a substantially similar method such that the three IG devices 120 may collectively generate a first view and a second view at the time T1.

The IG device 120-1 may receive VE model data 36 from the IG controller 32 (block 2000). The VE model data 36 may be provided to the IG devices 120 during an initialization phase, and then, each cycle, the IG controller 32 may broadcast additional VE model data 36 to the IG devices 120 based on information received from the host 38. The IG devices 120 may then update the VE model data 36 with the additional VE model data 36 to generate updated VE model data 36. In this manner, each of the IG devices 120 may maintain an up-to-date and synchronized view of the VE 10.

The IG device 120-1 may determine a first view frustum and a second view frustum (block 2002). In one embodiment, the IG device 120-1 may determine the first view frustum based on first view frustum data provided to the IG device 120-1 by the IG controller 32 during an initialization phase. The first view frustum data may comprise, by way of non-limiting example, the first viewpoint location 40 and a first window definition associated with the display area 28A. The IG device 120-1 may determine the second view frustum based on second view frustum data provided to the IG device 120-1 by the IG controller 32 during the initialization phase. The second view frustum data may comprise, by way of non-limiting example, the second viewpoint location 42 and a second window definition associated with the display area 28A.

The IG device 120-1 may intersect the VE model data 36 by the first view frustum and the second view frustum to identify first scene data and second scene data, respectively (block 2004). The graphics subsystem 126 may generate the first image 74A based on the first scene data (block 2006). In parallel, the graphics subsystem 128 may generate the second image 80A based on the second scene data (block 2008). The first image 74A and the second image 80A are output for display in the display area 28A (block 2010). In particular, an image pair may comprise the first image 74A and the second image 80A may be provided to the projector 30A for alternate display of the first image 74A and the second image 80A in the display area 28A.

In one embodiment, the IG control module 124-1 may initiate multiple threads, such that each thread executes in parallel with the other thread on separate cores of the multiple-core processor 122-1. Thus, a first thread may intersect the VE model data 36 with the first view frustum to identify first scene data, while a second thread in parallel may intersect the VE model data 36 with the second view frustum to identify second scene data. The first thread may provide the first scene data to the graphics subsystem 126, and the second thread, in parallel, may provide the second scene data to the graphics subsystem 128.

Substantially concurrently during the cycle at time T1, the IG device 120-2 may intersect the VE model data 36 with third and fourth view frustums, and the graphics subsystem 130 may generate the first image 76A while, in parallel, the graphics subsystem 132 may generate the second image 82A. During the cycle at time T2, the IG device 120-3 may intersect the VE model data 36 with fifth and sixth view frustums, and the graphics subsystem 134 may generate the first image 78A while, in parallel, the graphics subsystem 136 may generate the second image 84A. At the time T2, each of the IG devices 120 may generate a successive image, in a similar manner, based, in one embodiment, on updated VE model data 36 received from the IG controller 32, to form the first image streams 86-90 and the second image streams 92-96.

Figure 9:
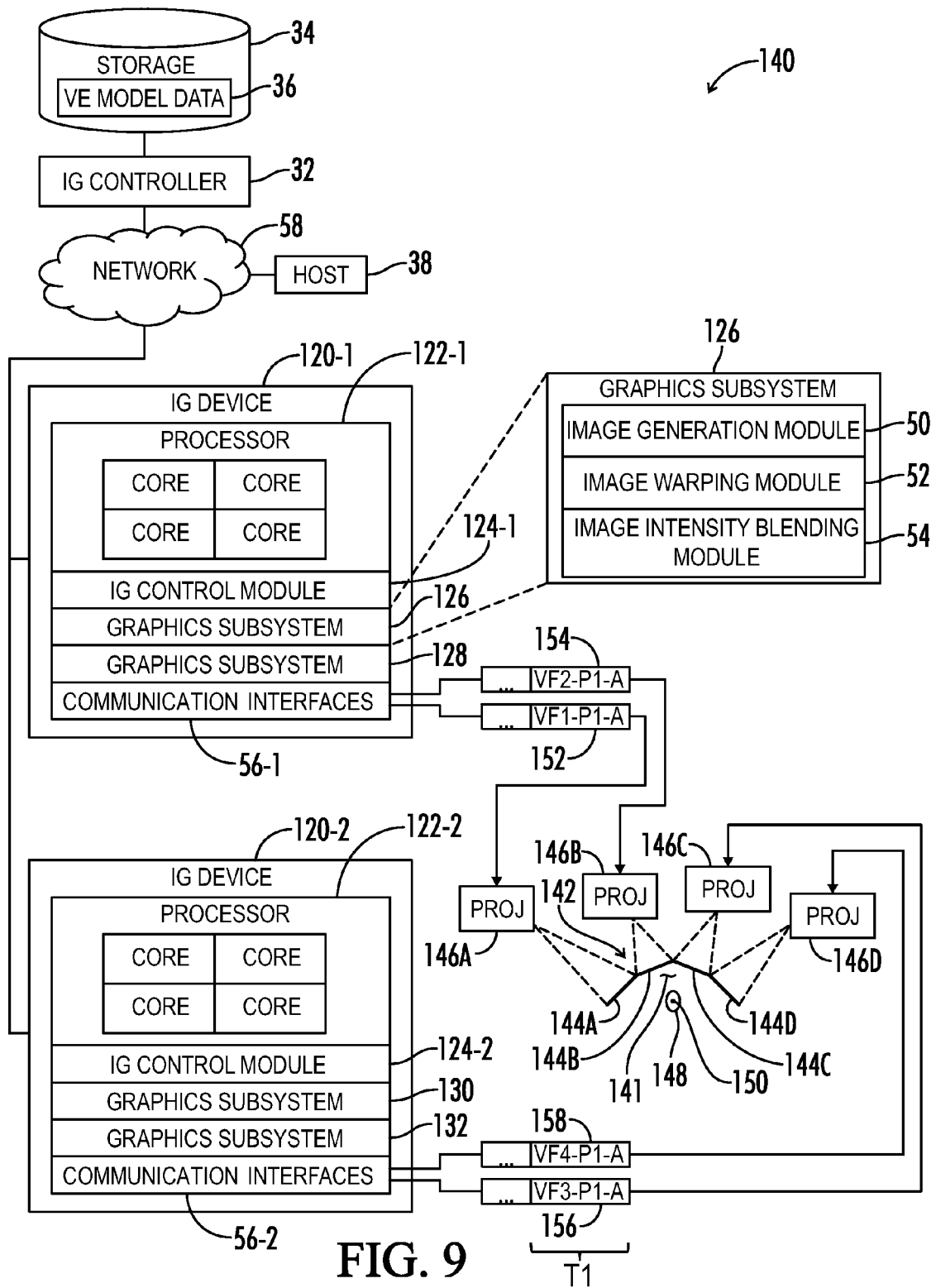
FIG. 9 is a block diagram of a system in which additional embodiments may be practiced.

FIG. 9 is a block diagram of a system 140 in which additional embodiments may be practiced. In this embodiment, the IG devices 120-1, 120-2 may generate multiple image streams to generate a single view for a simulated vehicle 141. The system 140 may include a display 142 comprising four display areas 144A-144D (generally, display areas 144). Each of a plurality of projectors 146A-146D may be associated with a particular display area 144. A participant 148 at a viewpoint location 150 may be positioned in proximity to the display areas 144. The IG devices 120 may generate images, in synchronization, to present a view of the VE 10 to the participant 148, based on view frustums that are determined, in part, by the viewpoint location 150, and window definitions associated with the display areas 144.

Figure 10B:
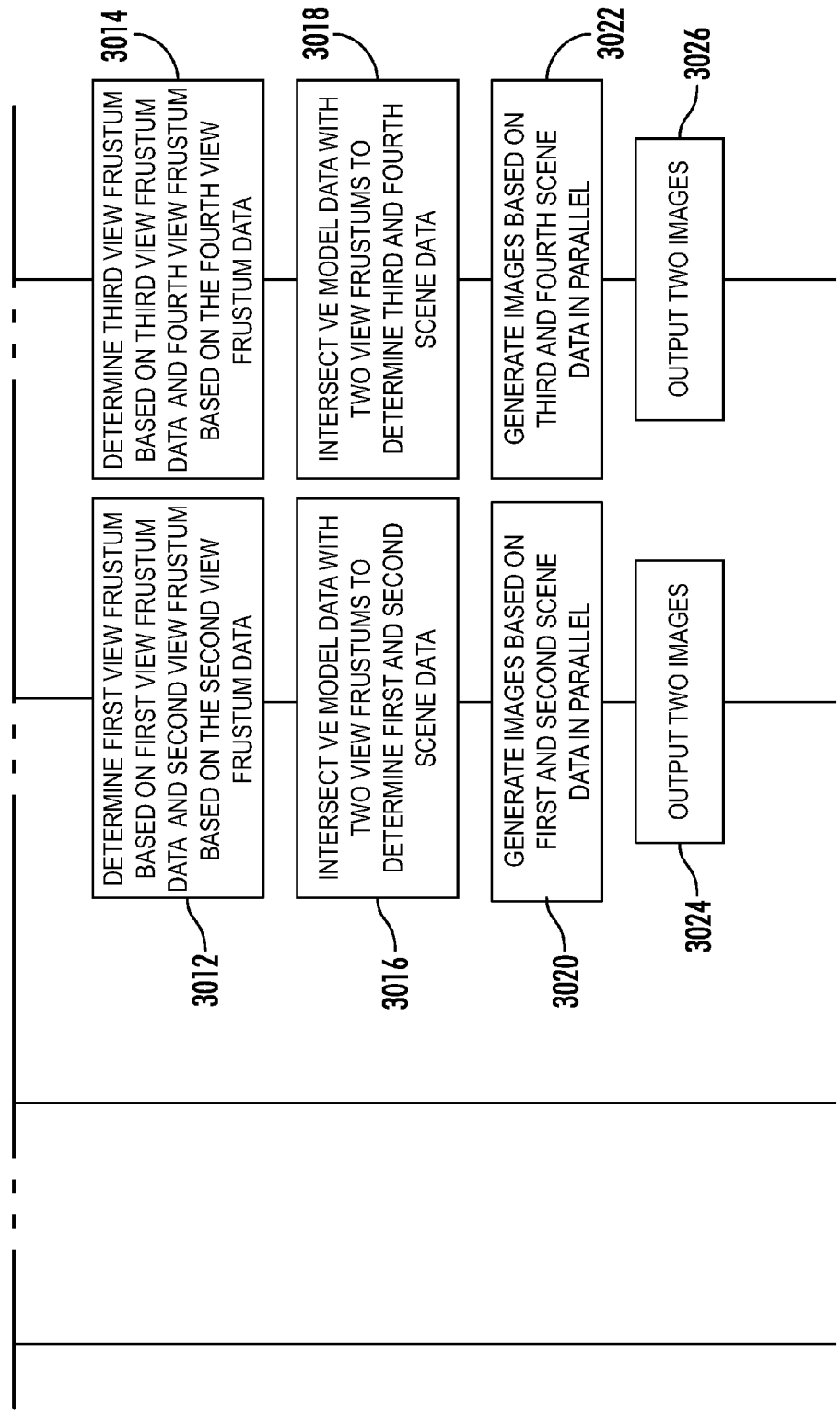

FIGS. 10A and 10B illustrate a message flow diagram of a message flow between elements in the system 140 for a cycle according to one embodiment. FIGS. 10A and 10B will be discussed in conjunction with FIG. 9. During an initialization phase, the IG controller 32 may receive information from the host 38 that includes initial positional data that identifies the viewpoint location 150 in the VE 10 (step 3000). The IG controller 32 may determine two view frustums for each IG device 120-1, 120-2, since there are four display areas 144 (step 3002). Each of the four view frustums may correspond to one of the display areas 144. The IG controller 32 may communicate, via the network 58, first view frustum data and second view frustum data to the IG device 120-1 (step 3004). The IG device 120-1 may be separately network addressable from the IG device 120-2. By way of non-limiting example, the IG device 120-1 may have an IP address that differs from an IP address of the IG device 120-2. Assume that the first view frustum data defines a first view frustum associated with the display area 144A and the second view frustum data defines a second view frustum associated with the display area 144B. The first view frustum data may comprise, by way of non-limiting example, the viewpoint location 150 and a window definition associated with the display area 144A that defines a particular vertical FOV and a particular horizontal FOV into the VE 10. The second view frustum data may comprise, by way of non-limiting example, the viewpoint location 150 and a window definition associated with the display area 144B that defines the same vertical FOV and a different horizontal FOV into the VE 10.

The IG controller 32 may communicate, via the network 58, third view frustum data and fourth view frustum data to the IG device 120-2 (step 3006). The third view frustum data may define a third view frustum associated with the display area 144C and the fourth view frustum data may define a fourth view frustum associated with the display area 144D. The third view frustum data may comprise, by way of non-limiting example, the viewpoint location 150 and a window definition associated with the display area 144C that defines the same vertical FOV and a different horizontal FOV into the VE 10. The fourth view frustum data may comprise, by way of non-limiting example, the viewpoint location 150 and a window definition associated with the display area 144D that defines the same vertical FOV and a different horizontal FOV into the VE 10.

The IG controller 32 may intersect the VE model data 36 based on the location of the simulated vehicle 141 to generate a subset of the VE model data 36 (step 3008). The IG controller 32 may broadcast the subset of VE model data 36 to each of the IG devices 120-1, 120-2 (step 3010). Each of the IG devices 120-1, 120-2 may store the subset of VE model data 36 in a local memory (not illustrated). The IG device 120-1 may determine the first view frustum based on the first view frustum data and the second view frustum based on the second view frustum data (step 3012). The IG device 120-2 may determine the third view frustum based on the third view frustum data and the fourth view frustum based on the fourth view frustum data (step 3014).

The IG device 120-1 may intersect the subset of VE model data 36 stored in the local memory with the first and second view frustums to determine first and second scene data (step 3016). The IG device 120-2 may intersect the subset of VE model data 36 stored in the local memory with the third and fourth view frustums to determine third and fourth scene data (step 3018). The graphics subsystem 126 may generate an image 152 based on the first scene data and the graphics subsystem 128 and, in parallel, may generate an image 154 based on the second scene data (step 3020). The graphics subsystem 130 may generate an image 156 based on the third scene data and the graphics subsystem 132 and, in parallel, may generate an image 158 based on the fourth scene data (step 3022).

The IG device 120-1 may output the images 152, 154 for concurrent display in the display areas 144A, 144B, respectively (step 3024). In synchronization, the IG device 120-2 may output the images 156, 158 for concurrent display in the display areas 144C, 144D, respectively (step 3026).

Figure 11:
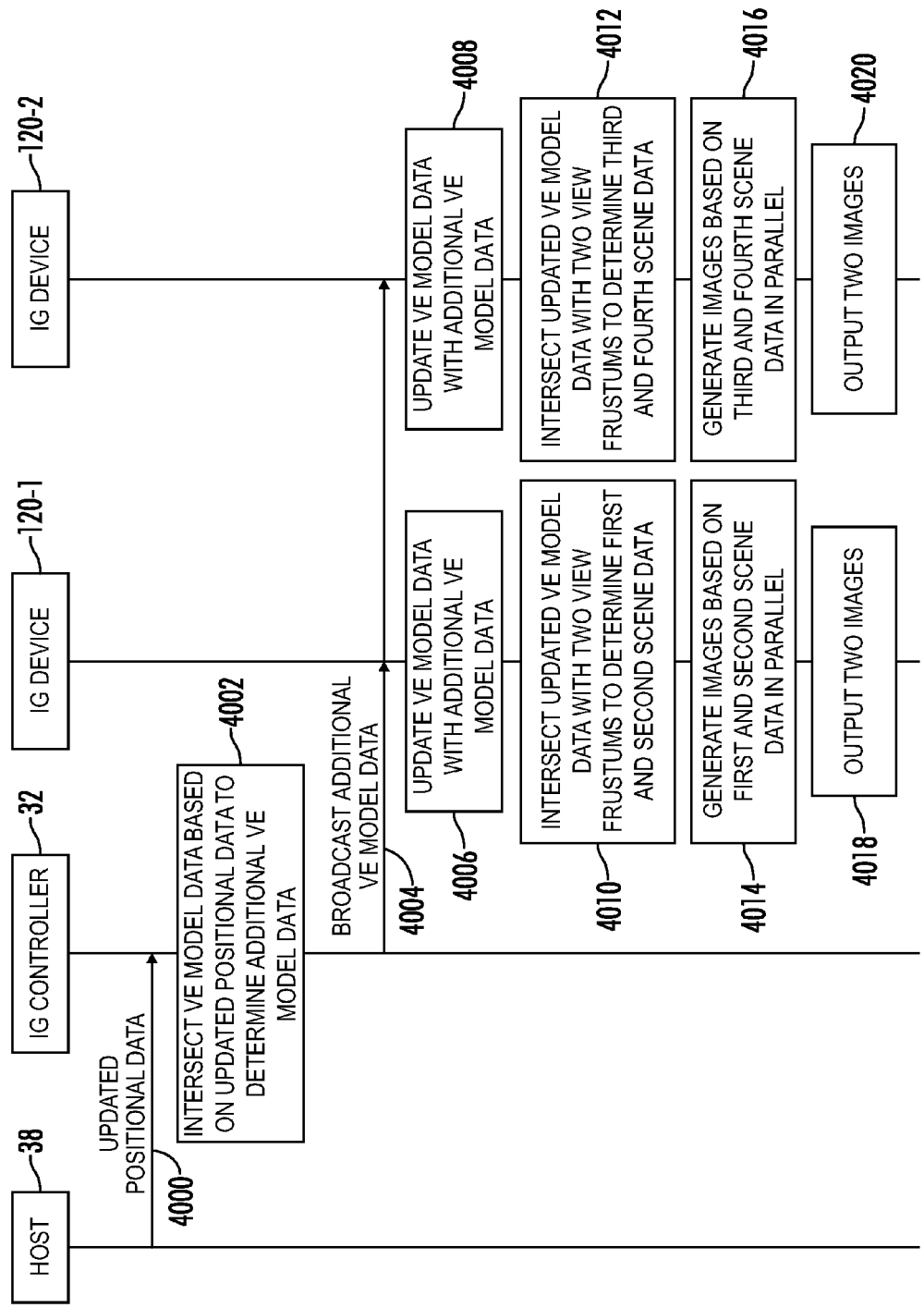
FIG. 11 illustrates a message flow between elements in the system shown in FIG. 9 during a subsequent cycle according to one embodiment.

FIG. 11 illustrates a message flow between elements during a second cycle immediately following the cycle described above with regard to FIGS. 10A-10B. The host 38 may provide updated positional data to the IG controller 32 (step 4000). The updated positional data may include, by way of non-limiting example, a different position of the simulated vehicle 141 based on directional inputs received from the participant 148, as well as different positions associated with other objects in the VE 10 that may move, such as other simulated vehicles in the VE 10 being operated by other participants in the VE 10.

The IG controller 32 intersects the VE model data 36 based on the updated positional data to determine additional VE model data 36 which may now be, or soon be, within a view frustum of one of the IG devices 120-1, 120-2 (step 4002). The IG controller 32 may broadcast the additional VE model data 36 to the IG devices 120-1, 120-2 (step 4004). The IG device 120-1 may update the VE model data 36 with the additional VE model data 36 received from the IG controller 32 to generate updated VE model data 36 (step 4006). The IG device 120-2 may similarly update the VE model data 36 with the additional VE model data 36 received from the IG controller 32 to generate updated VE model data 36 (step 4008). The IG device 120-1 may intersect the updated VE model data 36 with the first and second view frustums to determine first and second scene data (step 4010). The IG device 120-2 may intersect the updated VE model data 36 with the third and fourth view frustums to determine third and fourth scene data (step 4012).

The graphics subsystem 126 may generate a new image based on the first scene data, and the graphics subsystem 128 and, in parallel, may generate a new image based on the second scene data (step 4014). The graphics subsystem 130 may generate a new image based on the third scene data, and the graphics subsystem 132 and, in parallel, may generate a new image based on the fourth scene data (step 4016).

The IG device 120-1 may output the new images for concurrent display in the display areas 144A, 144B, respectively (step 4018). In synchronization, the IG device 120-2 may output the new images for concurrent display in the display areas 144C, 144D, respectively (step 4020). The process described in FIG. 11 may repeat for each cycle, such as, by way of non-limiting example, each $1/60^{th}$ of a second, for as long as the simulation continues.

Additional aspects of various embodiments are presented below.

An F-15S cockpit incorporates both a pilot and weapons system officer (WSO) eye point. Both eye points may be accommodated in a trainer via one of two visual system concepts: a single display system enclosing both eye points, or an individual display system (the "tandem display") for each eye point.

Figure 12:
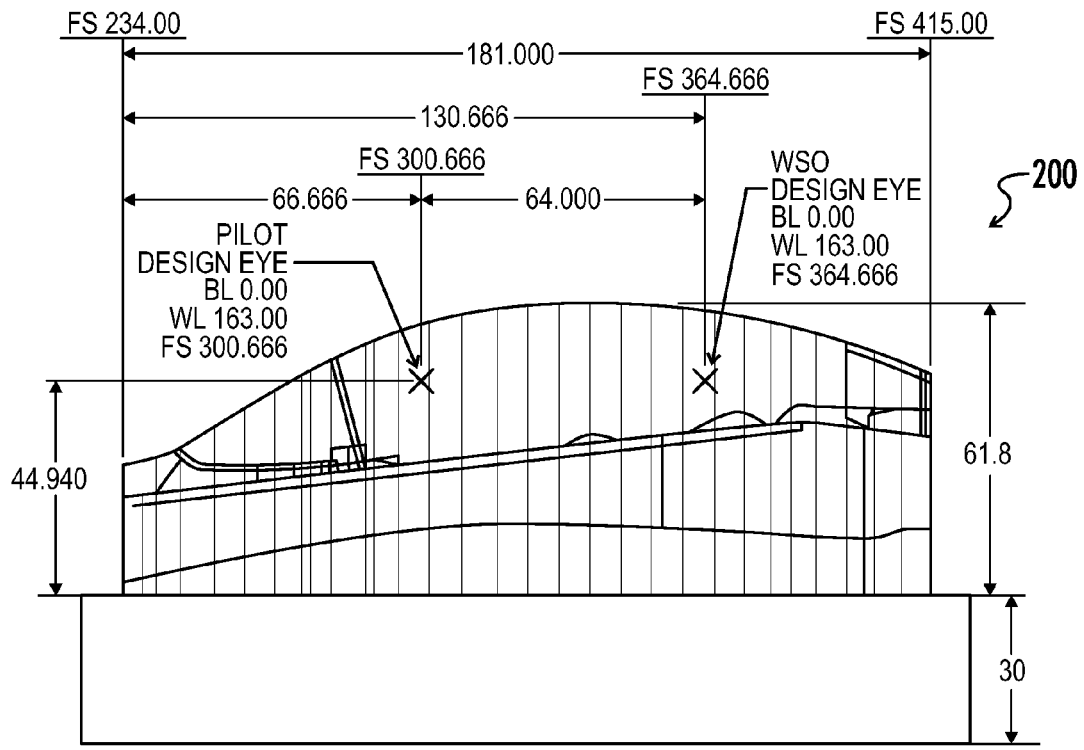
FIG. 12 illustrates a diagram of a side view of a cockpit for a current trainer, according to one embodiment.

FIG. 12 illustrates a diagram of a side view of a cockpit for a current trainer 200 according to one embodiment. Notably, the cockpit for the F-15S is relatively large. The offset between the two eye points (pilot and WSO), 64 inches, is also relatively large and introduces significant challenges for designing a single visual display accommodating both eye points. Issues include geometric differences between pilot eye point and WSO eye point, varying distances to the head-mounted displays (HMDs) associated with the two eye points, and the difficulties associated with achieving contrast and luminance as the size of the display increases to accommodate both positions.

Assuming that control of the host-generated graphics is available, the graphic representation of targeting information on a pilot HMD can be offset for a WSO HMD so that the pilot's designation of a target can be corrected for the WSO HMD. This may be done by representing the display shape geometrically and performing the necessary line-of-sight calculations from the pilot eye point to the pilot HMD and then the inverse calculation to the WSO.

The geometric differences in the display geometry will be discussed herein regarding how such geometric differences contribute to distortions of the appearance of the external environment.

Since an HMD system may be accommodated (the Joint Helmet-Mounted Cueing System), a visual system accommodating both will have varying distances to each eye point. This makes it difficult to have good simultaneous focus at all positions on the display of the external environment for an out-of-the-window (OTW) display and the HMD.

The contrast (25:1) and luminance (10 fl) goals are more difficult to achieve as the size of the display increases to accommodate both positions.

These issues are discussed below in more detail.

Summary of Display Alternatives

Several spherical dome display alternatives will be discussed below, including: a spherical dome display centered on the pilot eye point; and a spherical dome display with the pilot eye point offset within the spherical dome display to reduce geometric distortion at the WSO eye point, while still fully supporting a distortion-free representation at the pilot eye point.

Several ellipsoidal display alternatives will be discussed below, including: an ellipsoidal display which may be elongated to be more accommodative of the WSO eye point while still fully supporting the pilot eye point, and having space surrounding the ellipsoidal display to permit the placement of external projectors (i.e., a back-projected display); and an ellipsoidal display expanded to a relatively maximum size, implying the placement of projectors inside the ellipsoidal display enclosure. Such an arrangement may reduce the geometric distortion experienced at the WSO eye point.

Still further display alternatives discussed below include: a dual (e.g., tandem) display for a tandem cockpit, with the pilot and WSO cockpits completely separated; and a dual display for a tandem cockpit, with the pilot and WSO cockpits relatively close to each other.

Single Spherical Display with Dome Centered on Pilot Eye Point

Figure 13:
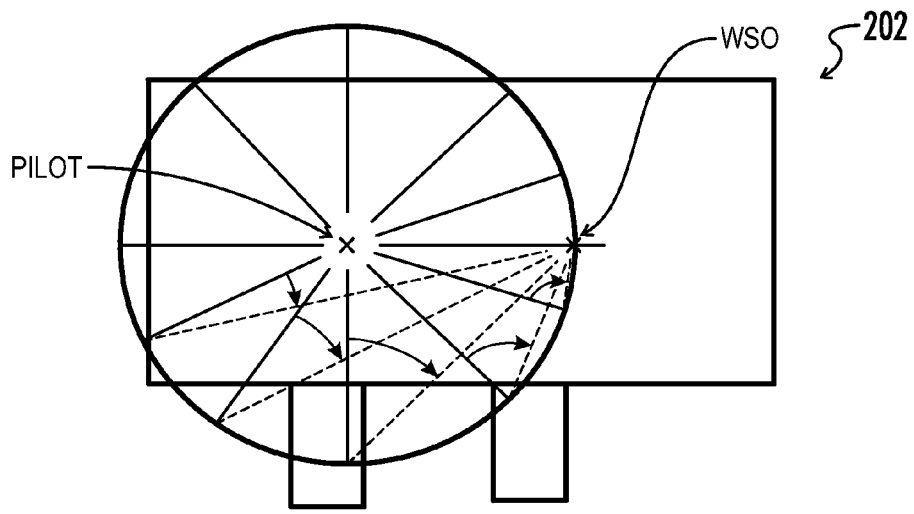
FIG. 13 is a diagram of a layout of a typical spherical dome display in plain view overlaid on a representative outline of an F-15S cockpit according to one embodiment.

FIG. 13 is a diagram of a layout 202 of a typical spherical dome display in plain view overlaid on a representative outline of the F-15S cockpit according to one embodiment. The pilot eye point and the WSO eye point are represented by small x's. The center of the spherical dome display may be centered on the pilot eye point.

The spherical dome display may be configured to have an approximate 65-inch radius. The sight lines to the pilot eye point are shown in solid lines. The sight lines to the WSO eye point are shown in dashed lines. Toward the back of the dome, due to the large offset between the pilot and WSO eye points, the difference between the WSO and pilot lines of sight may approach 90 degrees. This may be a very large degree of distortion. Even toward the midpoint of the spherical dome display viewing surface, the distortion may approximate 45 degrees.

Single Spherical Display with Dome Having Offset Eye Points

Figure 14:
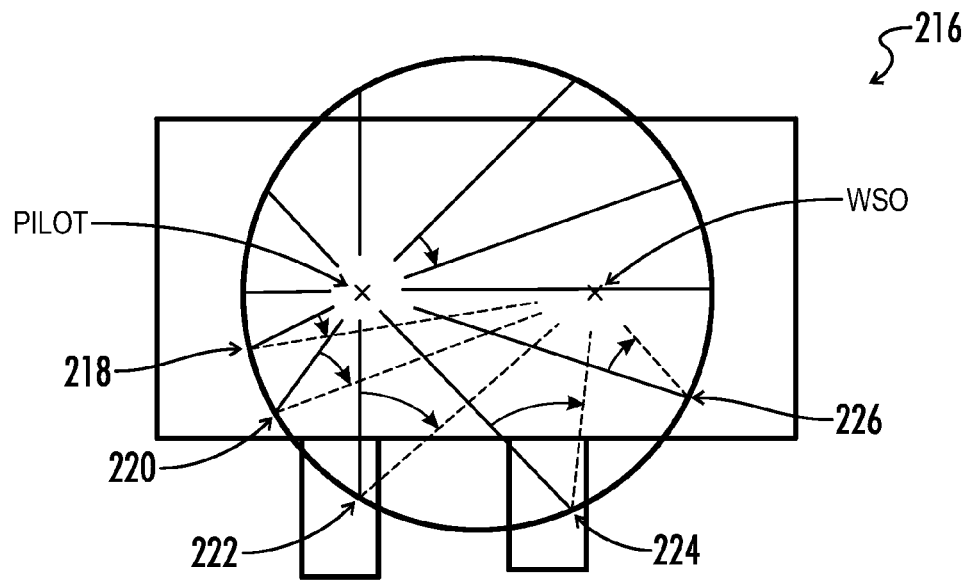
FIG. 14 is a diagram of an alternative single spherical dome display according to one embodiment.

FIG. 14 is a diagram of alternative single spherical dome display 216 according to one embodiment. The alternative single spherical dome display 216 may be configured to offset the pilot eye point within the dome to bring the WSO eye point to a more centered position and would geometrically modify the presentation to insure that the presentation may be correct from the pilot eye point. The configuration of the alternative single spherical dome display 216 may reduce the distortions at the WSO eye point.

Both the pilot and WSO may be equally offset within the alternative single spherical dome display 216. A comparison of the offset of the pilot line of sight versus the WSO line of sight is set forth in Table 1 below. The geometric errors are reduced as compared to the spherical dome display centered on the pilot eye point. The column numbers in Table 1 correspond to element reference numerals in FIG. 14.

TABLE 1

Offset Spherical Dome Geometric Error

| | Position | | | | | |
|---|---|---|---|---|---|---|
| | Front | 218 | 220 | 222 | 224 | 226 | Back |
| Angle (Degrees) | 0 | 26 | 56 | 90 | 132 | 162 | 180 |
| Error (Degrees) | 0 | 17.3 | 33.8 | 47.8 | 39.5 | 29.5 | 0 |

As can be seen in FIG. 14, the geometric errors at the midpoint (90 degrees) are larger than other angles. However, the average error may be much smaller than with the centered spherical dome display.

Single Ellipsoidal Display with Back Projection

Figure 15:
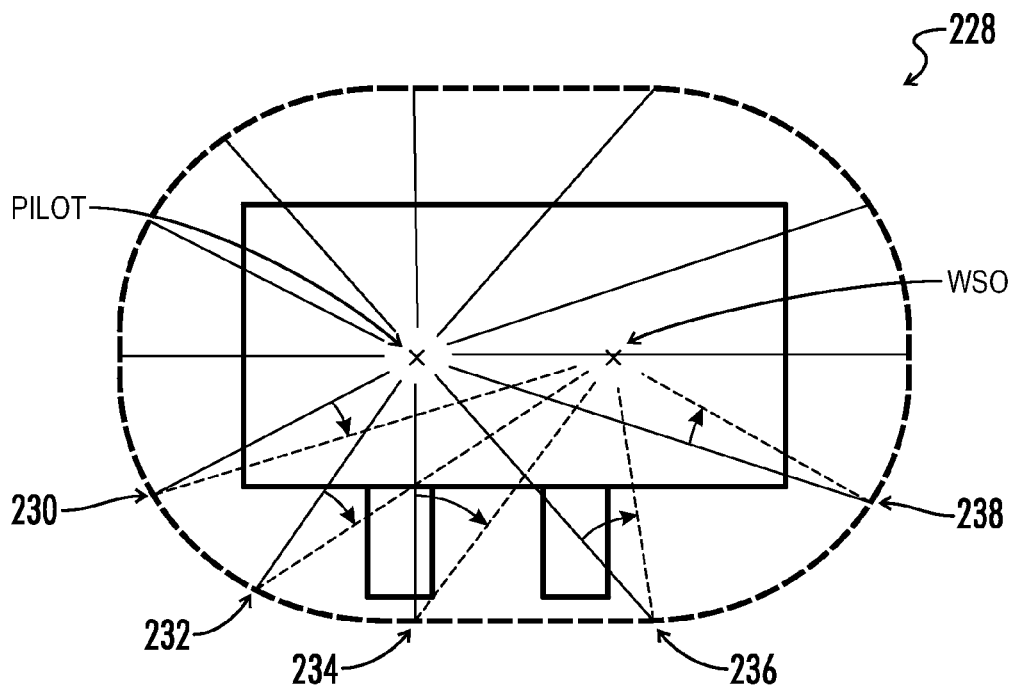
FIG. 15 is a diagram of a single ellipsoidal display with a back projection according to one embodiment.

FIG. 15 is a diagram of a single ellipsoidal display 228 with a back projection according to one embodiment. The single ellipsoidal display 228 is shaped to support both pilot and WSO eye points. As discussed above, lines representing lines of sight (solid lines) have been drawn from the pilot eye point to the display boundary. The display geometry would be implemented such that at the pilot eye point all geometry may be correct.

The difference in the geometry for the WSO eye point is illustrated via the dashed lines. For the front and back positions, there may be no difference in geometry. At an angle of approximately 90 degrees to the side from the pilot position, the error between the pilot eye point and the WSO eye point has grown to approximately 37 degrees due to the larger offset. Toward the back of the display, the error decreases towards zero.

Table 2 identifies the visual offset for the ellipsoidal display as a function of pilot viewing angle. The column numbers in Table 2 correspond to element reference numerals in FIG. 15.

TABLE 2

Ellipsoidal Geometric Error

| | Position | | | | | |
|---|---|---|---|---|---|---|
| | Front | 230 | 232 | 234 | 236 | 238 | Back |
| Angle (Degrees) | 0 | 26 | 56 | 90 | 132 | 162 | 180 |
| Error (Degrees) | 0 | 9.6 | 23.1 | 36.7 | 33.4 | 12 | 0 |

The results of Table 2 illustrate that there are some geometric errors for some angles in the ellipsoidal display. However, the errors may be less than with either spherical approach.

Single Ellipsoidal Display with Front Projection

The size of the ellipsoidal display set forth above was such that sufficient space exists to fit in projectors that surround the display boundary. If the display boundary may be further pushed out, geometric errors may decrease.

Figure 16:
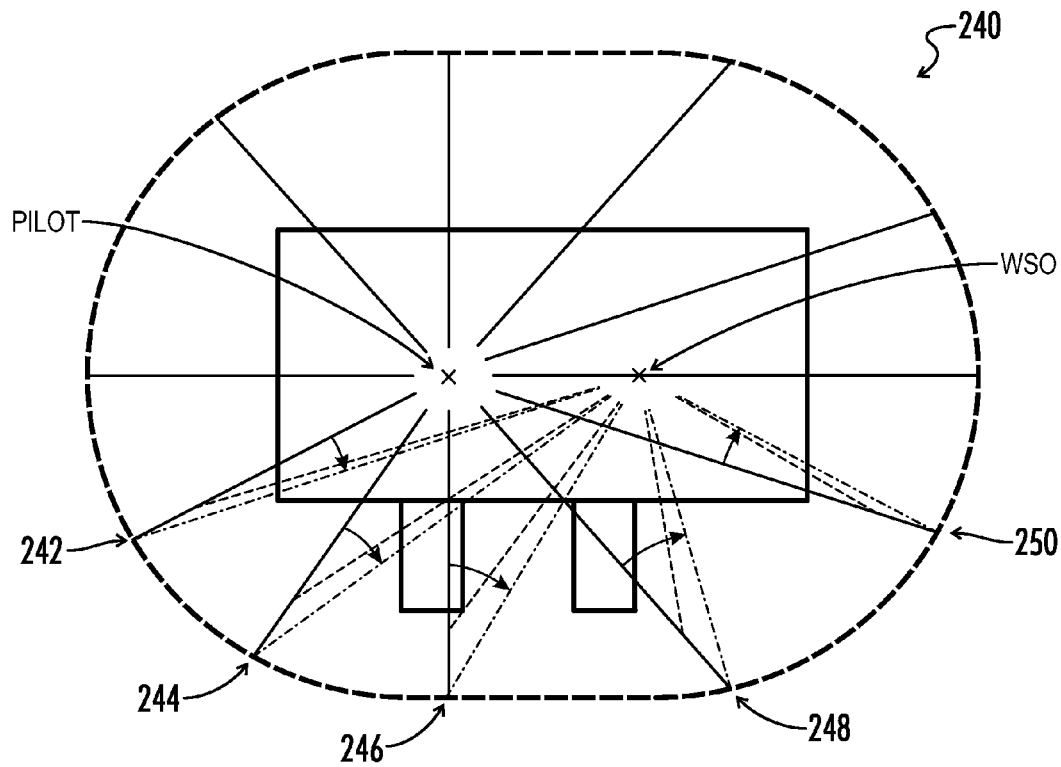
FIG. 16 is a diagram of a pushed-out ellipsoidal display in which the display boundary has been pushed out to a maximum nominal room size according to one embodiment.

FIG. 16 is a diagram of a pushed-out ellipsoidal display 240 having an ellipsoidal display in which the display boundary has been pushed out to a maximum nominal room size according to one embodiment. In this embodiment, additional room capacity would have to be found surrounding the cockpit to fit the display projectors inside the display enclosure.

FIG. 16 shows reduced geometric distortion in that the two groups of lines converging toward the WSO eye point, one group from the new boundary of the display, show a narrower cone angle and therefore lower geometric distortion as compared to the pilot eye point. Table 3 is the nominal error for the same positions discussed with regard to FIG. 15. The column numbers in Table 3 correspond to element reference numerals in FIG. 16.

TABLE 3

Large Ellipsoidal Geometric Error

| | \multicolumn{7}{c}{Position} |
|---|---|---|---|---|---|---|---|
| | Front | 242 | 244 | 246 | 248 | 250 | Back |
| Angle (Degrees) | 0 | 26 | 56 | 90 | 132 | 162 | 180 |
| Error (Degrees) | 0 | 7.4 | 20.3 | 30.8 | 25.9 | 10.3 | 0 |

The results of Table 3 show that somewhat less than a 20% reduction in the geometric error may be achieved with the larger display. Using a relatively large number of projectors to achieve a 4.0 arc-minute resolution in a non-distracting manner surrounding the interior space next to the cockpit may or may not be justified by this improvement.

This embodiment may have a relatively smooth ellipsoidal shape. The shape may be approximated via a faceted display since the non-recurring effort to create a customized smoothly surfaced display would be large. However, a faceted display approximation may also be fitted with convenient entry and exit points for the pilot and WSO and may be easily maintained as well.

Dual (Tandem) Displays Centered at Pilot and WSO Eye Points

Figure 17:
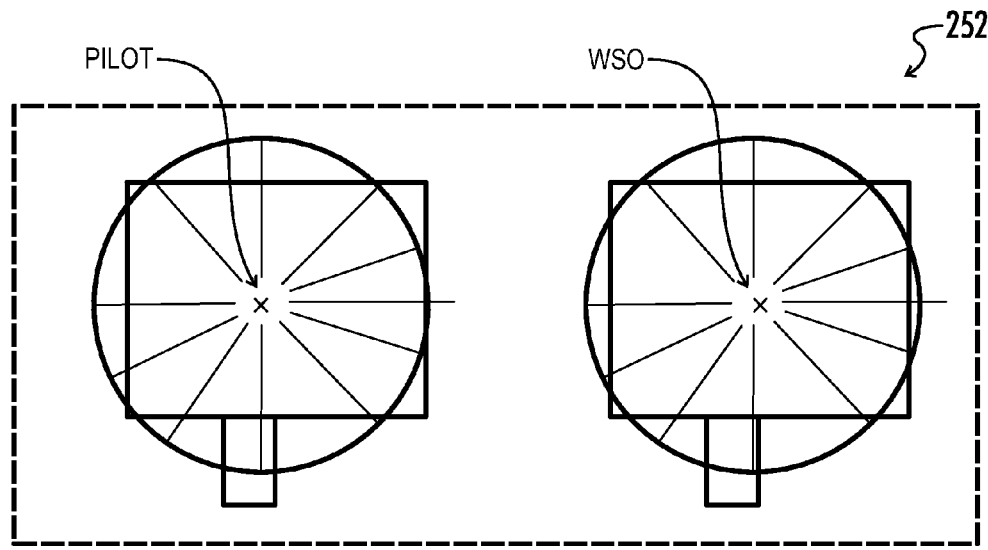
FIG. 17 is a diagram of a layout of dual tandem displays centered at pilot and WSO eye points according to one embodiment.

FIG. 17 is a diagram of dual tandem displays 252 having tandem spherical displays centered at pilot and WSO eye points according to one embodiment. In this embodiment, two displays are used with the pilot and WSO cockpits separated to allow each position to have an independent display system.

In terms of geometric distortion, at the eye point for each position no distortion exists since each display may be optimized for the individual's point of view.

The tandem display illustrated in FIG. 17 has the disadvantage of eliminating direct visual communication between the pilot and the WSO.

Dual (Tandem) Displays with Separate Cockpits

Figure 18:
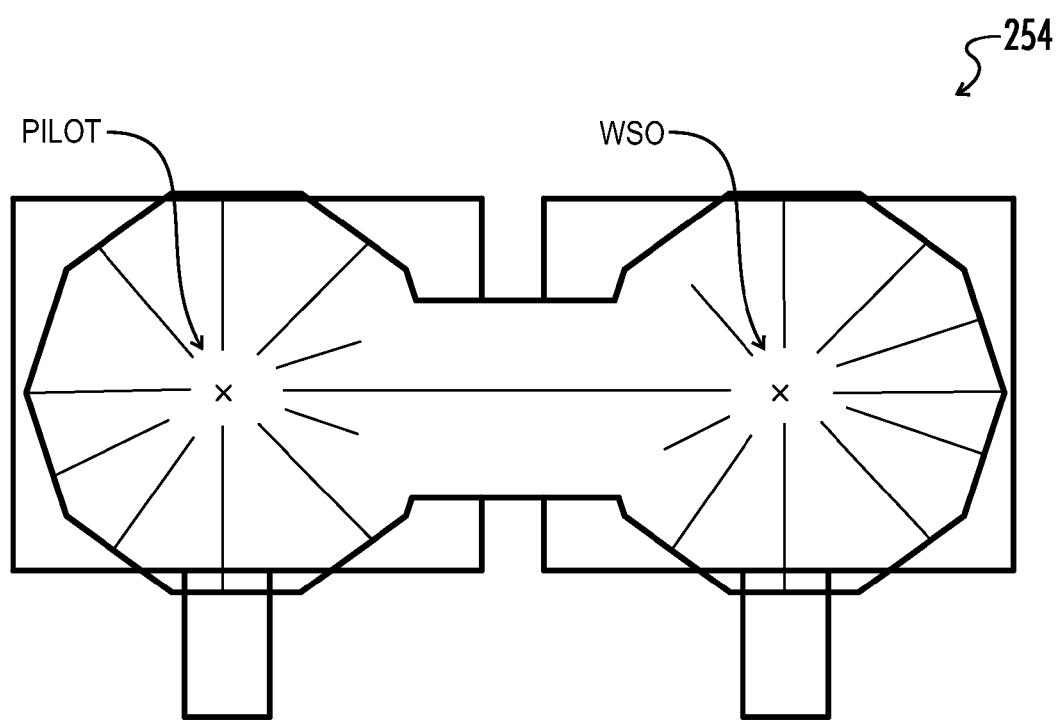
FIG. 18 is a diagram of a layout of tandem connected displays according to one embodiment.

FIG. 18 is a diagram of dual tandem displays 254 having tandem connected displays with separate cockpits in accordance with an embodiment. The dual tandem displays 254 may have two reduced-diameter visual displays and an increased distance between the two cockpits, with a cutout in each display/cockpit to permit visual communication. With the increased distance between the two cockpits the size of the cutout for each display may be reduced to no more than the obscuration to be expected for each eye point in the aircraft to the presence of the other eye point. However, the cutout may permit visual (and auditory) communication between the pilot and the WSO. The reduction in size of the displays may also support increased brightness.

Other Considerations

Other visual quality factors may affect the pilot and WSO eye points as a function of the type of display selected. These may include:

1) Luminance and Contrast

As display size increases, the difficulty of achieving a given brightness and contrast level may increase. Large displays may include higher brightness projectors.

2) Resolution and Scaling Variation

The distance variation from the WSO eye point as compared to the pilot eye point (for a single display supporting both positions) may cause the resolution perceived at the WSO eye point to be different from the resolution perceived at the pilot eye point. For a given point on the screen, assuming the display may be adjusted to provide a constant resolution for the pilot eye point, the resolution may appear to be better if the screen distance is larger or poorer if the screen distance is less. In direct proportion, the scaling of the display may be incorrect at the WSO eye point as well.

3) Focus Variation

For both the pilot and WSO eye points, distance variation over the field of view may make it more difficult to focus on the HMD graphics and the OTW display graphics simultaneously. The HMD will be set to a single fixed distance. If the OTW display graphics are markedly different, then the pilot or the WSO will be forced to focus on either the HMD graphics or the OTW display graphics. Simultaneous viewing may not be possible (e.g., when a graphic in the OTW display is sharply in focus, the HMD graphic will be fuzzy).

Table 4 identifies issues associated with the various displays illustrated above according to the above considerations.

TABLE 4

Additional Performance Factors Summary

| Display Type | Luminance/ Contrast Pilot Position | Luminance/ Contrast WSO Position | Resolution/ Scaling variation: WSO | Focus: Pilot | Focus: WSO |
|---|---|---|---|---|---|
| Pilot Centered Sphere | 65 inch sphere. High brightness projectors. Good design for uniformity. | 129 inch to 1 inch distance variation. Coating design critical for uniformity. | Varies from 2:1 error at front to very large scaling/ resolution error at back. | Not an issue. Uniform radius. | Very large variation. Large Issue. |

TABLE 4-continued

Additional Performance Factors Summary

| Display Type | Luminance/Contrast Pilot Position | Luminance/Contrast WSO Position | Resolution/Scaling variation: WSO | Focus: Pilot | Focus: WSO |
|---|---|---|---|---|---|
| Offset Sphere | 65 inch sphere, 32 to 97 inch distance variation. High brightness projectors. Coating design critical for uniformity. | 65 inch sphere, 32 to 97 inch distance variation. High brightness projectors. Coating design critical for uniformity. | Varies from 3:1 too small to 3:1 too large. Large scaling and resolution errors. | With HMD at 50 inches, D change = −0.38D to +0.40D. Focus Issue. | With HMD at 50 inches, D change = −0.38D to +0.40D. Focus Issue. |
| Small Ellipsoid | Has > 50% larger radius than sphere and > 100% more surface area. High brightness projectors. | Same as pilot. Coating design critical for uniformity. | ~35% scaling error at front. Small error at back. Relatively good. | Smaller distance variation. Good HMD focus. | Same as pilot. |
| Large Ellipsoid | ~45% more surface area than small ellipsoid. Requires high gain front projected surface. | Uniformity very difficult if high gain surface used. | Low distance variation. Relatively good for scaling and resolution. | Smaller distance variation. Good HMD focus. | Same as pilot. |
| Separate Tandem | Can use smaller display. Lowers projector brightness requirement. | Same as pilot. | Same as pilot. Very good. | Small distance variation. Very good. | Same as pilot. |
| Connected Tandem | Can use smaller display. Lowers projector brightness requirement. | Same as pilot. | Same as pilot. Very good. | Small variation. Very good. | Same as pilot. |

SUMMARY

Issues associated with each of the types of displays considered have been discussed herein. The weighting associated with the quality of the type of display at the WSO eye point may be a relatively important issue. If it is only necessary that the WSO see the OTW display, then one of the embodiments described above in relation to FIGS. 14-18 may be employed. If other fidelity requirements exist, such as relatively low geometric distortion, ability to focus on both the HMD and the OTW display simultaneously, low resolution variation, etc., then the types of displays that can be used are more limited.

Cost may also vary according to the complexity of the type of display and the amount of non-recurring engineering involved. A faceted approximation to the ellipsoidal and small spherical displays may be used to reduce any unique tooling effort. The tandem displays, with their larger number of projectors, may be the most expensive. However the reduced size of the tandem displays and the fact that they are centered on both the pilot and WSO eye point positions would mean they may be the least technically difficult of the solutions. Since the WSO would be viewing the same scene as the pilot, additional IG channels may not be required.

Those skilled in the art will recognize improvements and modifications to the embodiments of the present disclosure. All such improvements and modifications are considered within the scope of the concepts disclosed herein and the claims that follow.

What is claimed is:

1. A method comprising:
   receiving, by a device via a network from an image generator controller, virtual environment (VE) model data identifying at least a portion of a VE, and a first viewpoint location and a first window definition;
   determining, by the device, a first view frustum in the VE based on the first viewpoint location and the first window definition, and a second view frustum in the VE; and
   for each cycle of a plurality of cycles over a period of time:
   intersecting, the device, the VE model data by the first view frustum and the second view frustum to identify first scene data and second scene data, respectively;
   processing, by a first graphics subsystem of the device, the first scene data to generate a first image;

processing, by a second graphics subsystem of the device in parallel with the first graphics subsystem, the second scene data to generate a second image; and outputting the first image and the second image for display.

2. The method of claim 1, wherein the first window definition corresponds to a first display area, and further comprising, for each cycle, presenting the first image in the first display area.

3. The method of claim 2, further comprising receiving, from the image generator controller, the first viewpoint location and a second window definition, and wherein determining the second view frustum in the VE comprises determining the second view frustum in the VE based on the first viewpoint location and the second window definition.

4. The method of claim 3, wherein the second window definition corresponds to a second display area, and further comprising, for each cycle, presenting the second image in the second display area.

5. The method of claim 1, further comprising:
receiving, each cycle, additional VE model data;
incorporating the additional VE model data into the VE model data to generate updated VE model data; and
wherein intersecting the VE model data by the first view frustum to identify the first scene data comprises intersecting the updated VE model data by the first view frustum to identify the first scene data.

6. The method of claim 1, further comprising receiving, via the network from the image generator controller, a second viewpoint location, and a second window definition, wherein determining the second view frustum in the VE comprises determining the second view frustum in the VE based on the second viewpoint location and the second window definition.

7. The method of claim 6, wherein outputting the first image and the second image for presentation comprises outputting an image pair comprising the first image and the second image for alternate display in a same display area of a plurality of display areas.

8. The method of claim 7, further comprising geometrically warping each first image and each second image prior to outputting the image pair for alternate display in the same display area.

9. The method of claim 8, wherein each first image is warped based on the first viewpoint location, and each second image is warped based on the second viewpoint location.

10. The method of claim 7, further comprising:
altering an intensity of portions of each first image based on a predetermined overlap region of a first display area with an adjacent second display area and on the first viewpoint location; and
altering an intensity of portions of each second image based on the predetermined overlap region of the first display area with the adjacent second display area and on the second viewpoint location.

11. A device, comprising:
a communication interface configured to communicate with a network;
a first graphics subsystem and a second graphics subsystem; and
a processor coupled to the communication interface, the first graphics subsystem, and the second graphics subsystem, the processor configured to:
via the communication interface, receive virtual environment (VE) model data identifying at least a portion of a VE, and a first viewpoint location and a first window definition from an image generator controller;
determine a first view frustum in the VE based on the first viewpoint location and the first window definition, and a second view frustum in the VE; and
for each cycle of a plurality of cycles over a period of time:
intersect the VE model data by the first view frustum to identify first scene data and by the second view frustum to identify second scene data;
process, by the first graphics subsystem, the first scene data to generate a first image;
in parallel with the first graphics subsystem, process, by the second graphics subsystem, the second scene data and to generate a second image based on the second scene data; and
output the first image and the second image for presentation.

12. The device of claim 11, wherein the processor comprises a multiple core processor, and is further configured to:
initiate in parallel a first processing thread for intersecting the VE model data by the first view frustum in the VE to identify the first scene data, and a second processing thread for intersecting the VE model data by the second view frustum in the VE to identify the second scene data.

13. The device of claim 12, wherein the first processing thread is configured to communicate the first scene data to the first graphics subsystem and the second processing thread is configured to communicate the second scene data to the second graphics subsystem.

14. The device of claim 11, wherein the processor is further configured to:
receive, each cycle, additional VE model data;
incorporate the additional VE model data into the VE model data to generate updated VE model data; and
wherein to intersect the VE model data by the first view frustum to identify the first scene data, the processor is further configured to intersect the updated VE model data by the first view frustum to identify the first scene data.

15. The device of claim 11, wherein the processor is further configured to receive a second viewpoint location, and a second window definition, wherein to determine the second view frustum in the VE, the processor is configured to determine the second view frustum in the VE based on the second viewpoint location and the second window definition.

16. The device of claim 15, wherein to output the first image and the second image for presentation, the processor is configured to output an image pair comprising the first image and the second image for alternate display in a same display area of a plurality of display areas.

17. A system comprising:
an image generator (IG) controller configured to communicate with a communication network;
a plurality of IG devices, each IG device being network addressable and configured to communicate with the communication network;
the IG controller comprising a processor and configured to communicate, to each IG device, virtual environment (VE) model data identifying at least a portion of a VE, and view frustum data suitable for determining two different view frustums in the VE, the view frustum data for each IG device comprising at least a respective first viewpoint location and a respective first window definition; and
each IG device comprising a processor and configured to:
determine a first view frustum based on the respective first viewpoint location and the respective first window definition, and a second view frustum in the VE;

intersect the VE model data by the first view frustum to identify first scene data and by the second view frustum to identify second scene data;

process, by a first graphics subsystem of the IG device, the first scene data to generate a first image based on the first scene data;

in parallel, process, by a second graphics subsystem of the IG device, the second scene data to generate a second image based on the second scene data; and output the first image and the second image for presentation.

\* \* \* \* \*